US007962577B2

(12) United States Patent
Nakamura et al.

(10) Patent No.: US 7,962,577 B2
(45) Date of Patent: Jun. 14, 2011

(54) DATA PROCESSING SYSTEM, DATA PROCESSOR, AND METHOD OF OPERATING DATA PROCESSING SYSTEM

(75) Inventors: Tomoki Nakamura, Nagoya (JP); Fumitoshi Uno, Okazaki (JP); Yusaku Takahashi, Obu (JP); Akidi Yoshida, Nogoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 156 days.

(21) Appl. No.: 12/038,686

(22) Filed: Feb. 27, 2008

(65) Prior Publication Data

US 2008/0209006 A1    Aug. 28, 2008

(30) Foreign Application Priority Data

Feb. 27, 2007  (JP) ................................. 2007-046667
Feb. 28, 2007  (JP) ................................. 2007-050336

(51) Int. Cl.
*G06F 15/16* (2006.01)
*G06F 15/167* (2006.01)
(52) U.S. Cl. ........................................................ 709/219
(58) Field of Classification Search .................. 709/203, 709/216, 217, 231, 219
See application file for complete search history.

(56) References Cited

U.S. PATENT DOCUMENTS

| | | | | |
|---|---|---|---|---|
| 5,851,186 A * | 12/1998 | Wood et al. | ................... | 600/437 |
| 5,905,866 A * | 5/1999 | Nakabayashi et al. | ........ | 709/223 |
| 6,163,779 A * | 12/2000 | Mantha et al. | ................ | 715/234 |
| 6,249,817 B1 * | 6/2001 | Nakabayashi et al. | ........ | 709/224 |
| 6,385,654 B1 | 5/2002 | Tanaka | | |
| 6,686,964 B1 * | 2/2004 | Makishima et al. | ..... | 348/333.02 |
| 7,249,315 B2 * | 7/2007 | Moetteli | ........................ | 715/234 |
| 7,272,845 B2 * | 9/2007 | Creamer et al. | .............. | 725/105 |
| 7,350,224 B2 * | 3/2008 | Creamer et al. | .............. | 725/105 |
| 7,373,392 B2 | 5/2008 | Nishihara et al. | | |

(Continued)

FOREIGN PATENT DOCUMENTS

JP    H11-143760 A    5/1999

(Continued)

OTHER PUBLICATIONS

Japan Patent Office; Office Action in Japanese Patent Application No. 2007-046667 (counterpart to the above-captioned U.S. Patent Application) mailed Jan. 28, 2009.

(Continued)

*Primary Examiner* — Shawki S Ismail
*Assistant Examiner* — Vitali Korobov
(74) *Attorney, Agent, or Firm* — Bakers Botts L.L.P.

(57) ABSTRACT

A data processor is communicable with a host device via a network. The data processor includes a media connecting unit, a file creating unit, a data transmitting unit, and an operation executing unit. The media connecting unit is capable of connecting a storage medium. The file creating unit creates a controlling file for controlling the storage medium. The data transmitting unit transmits data identifying the controlling file to the host device for allowing the host device to access the file. The operation executing unit executes an operation of the storage medium in response to receiving a transmission request of the controlling file.

32 Claims, 42 Drawing Sheets

U.S. PATENT DOCUMENTS

| | | | |
|---|---|---|---|
| 7,425,987 B2 * | 9/2008 | Creamer et al. | 348/211.3 |
| 7,428,004 B2 * | 9/2008 | Creamer et al. | 348/211.3 |
| 7,428,005 B2 * | 9/2008 | Creamer et al. | 348/211.3 |
| 2005/0091578 A1 * | 4/2005 | Madan et al. | 715/512 |
| 2007/0078768 A1 * | 4/2007 | Dawson | 705/50 |
| 2008/0239383 A1 | 10/2008 | Okajima | |
| 2009/0217169 A1 | 8/2009 | Takahashi et al. | |

FOREIGN PATENT DOCUMENTS

| | | |
|---|---|---|
| JP | 2002-149531 A | 5/2002 |
| JP | 2003177987 A | 6/2003 |
| JP | 2003-323330 A | 11/2003 |
| JP | 2004-272800 A | 9/2004 |

OTHER PUBLICATIONS

Japan Patent Office; Office Action in Japanese Patent Application No. 2007-050336 (counterpart to the above-captioned U.S. Application) mailed Jan. 28, 2009.

* cited by examiner

FIG.15A ftp://brn_a821ea/_CONTROL//FormatMemoryCard.txt

MEMORY CARD IS BEING FORMATTED.
PLEASE WAIT UNTIL THE ACCESS LAMP STOPS BLINKING
AND REMAINS LIT.

FIG.15B ftp://brn_a821ea/_CONTROL//FormatMemoryCard.txt

MEDIA IS NOT INSERTED.

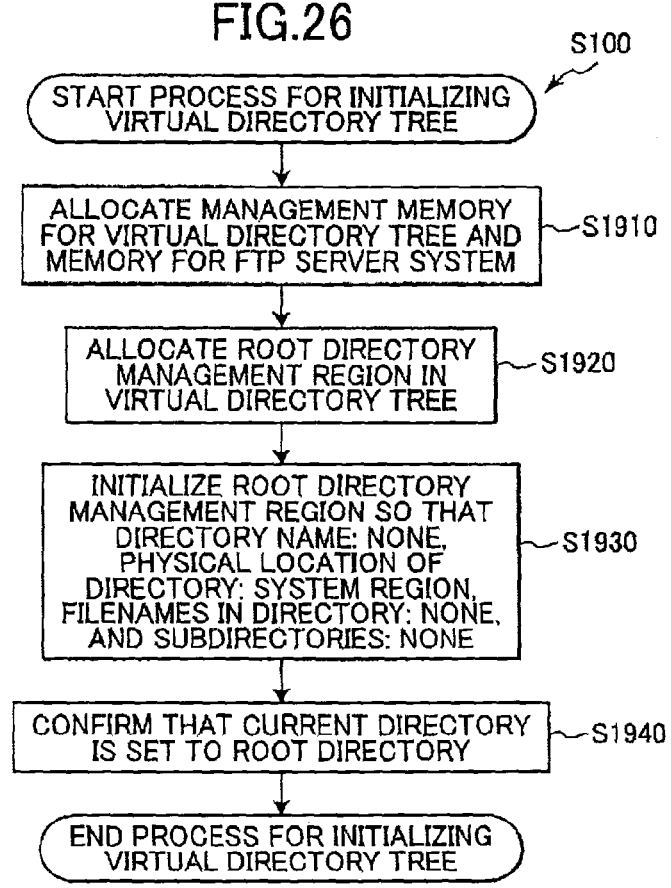

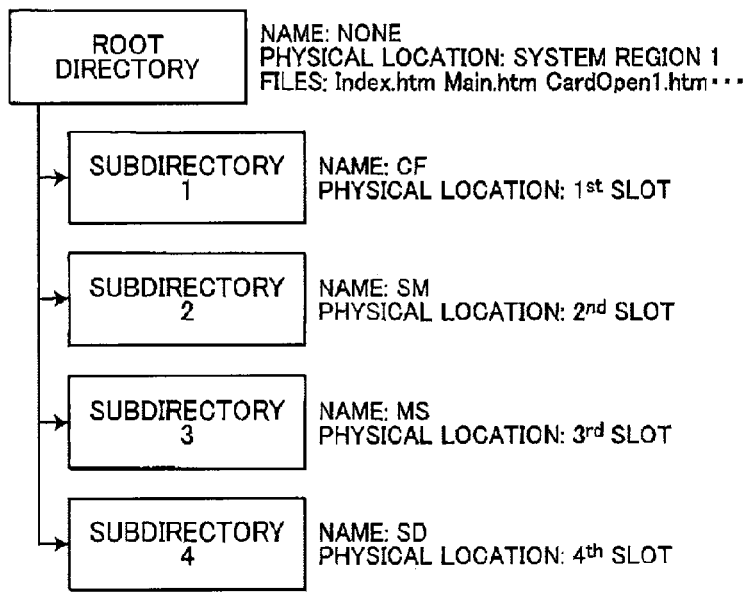

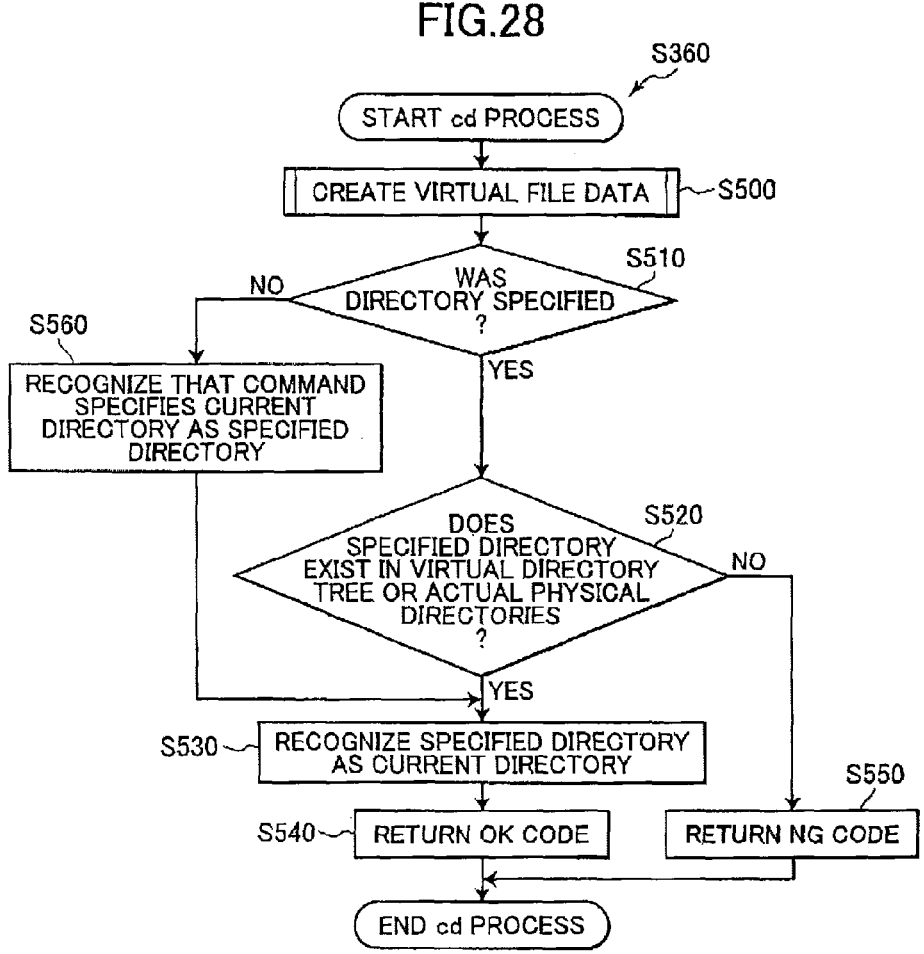

DATA PROCESSING SYSTEM, DATA PROCESSOR, AND METHOD OF OPERATING DATA PROCESSING SYSTEM

CROSS REFERENCE TO RELATED APPLICATION

This application claims priorities from Japanese Patent Applications No. 2007-046667 filed Feb. 27, 2007 and No. 2007-050336 filed Feb. 28, 2007. The entire contents of the priority applications are incorporated herein by reference.

TECHNICAL FIELD

The present invention relates to a data processor, a data processing system configured of the processor and host devices, and a method of operating the data processing system.

BACKGROUND

A technology for transferring files via file transfer protocol (FTP) is well known in the art (Japanese Patent Application Publication No. 2003-177987, for example).

In recent years, memory cards have become quite popular as a type of storage media. Memory cards have a nonvolatile memory, such as flash memory, in a card-like package and have rapidly become a common storage media used for storing data in digital equipment, such as digital cameras and portable music players. A variety of memory cards with no standardized specifications have appeared on the market, such as CompactFlash (registered trademark; hereinafter abbreviated as "CF"), SmartMedia (registered trademark; hereinafter abbreviated as "SM"), Memory Stick (registered trademark; hereinafter abbreviated as "MS"), and SD cards (registered trademark; hereinafter abbreviated as "SD").

These memory cards are connected to a memory card reader/writer (hereinafter abbreviated to "reader/writer") capable of reading from and writing to the memory card. A personal computer (PC) or the like capable of communicating with the reader/writer can access a memory card connected to the reader/writer Printing devices equipped with such a reader/writer have become popular in recent years. By connecting a memory card storing an image data file saved according to the JPEG format, for example, to such a reader/writer, the printing device can directly print the images without the user of a PC.

If an FTP client program is installed on a PC or the like, and an FTP server program is provided in the card reader, by connecting a memory card used as the destination for saving data files of photographed images for a digital camera or a cell phone with a camera function to the reader/writer, the data file saved in the memory card can be transmitted to the PC according to FTP. In other words, the reader/writer can be used with the PC as an external FTP processor.

SUMMARY

However, the FTP protocol has not been designed with the idea of the FTP server handling storage media (removable media). Therefore, when the FTP processor described above (or a printer or other peripheral device provided with the FTP processor) has been equipped with an FTP server, a client operating according to the FTP protocol alone has not been able to control the media directly or perform media-based operations, including such operations as formatting the media and copying files between different media. It has also been impossible to display data from memory card readers on a network or for a client to format or perform other operations on the memory cards.

One method of resolving this problem may be to expand and modify the FTP protocol itself so that a client operating based on the FTP protocol can directly access the media itself or perform direct media-based operations, but a large number of users or existing FTP clients would not be able to take advantage of this benefit. Further, any expansions or modifications to the FTP protocol would require approval through an international organization and is, hence, unrealistic.

Therefore, it is an object of the present invention to provide a data processor that allows an external device according to a protocol, such as FTP, to access media on the data processor directly, assuming that the protocol may be used without any expansions or modifications thereto.

To achieve the above and other objects, one aspect of the invention provides a data processor is communicable with a host device via a network. The data processor includes a media connecting unit, a file creating unit, a data transmitting unit, and an operation executing unit. The media connecting unit is capable of connecting a storage medium. The file creating unit creates a controlling file for controlling the storage medium. The data transmitting unit transmits data identifying the controlling file to the host device for allowing the host device to access the file. The operation executing unit executes an operation of the storage medium in response to receiving a transmission request of the controlling file.

In another aspect of the present invention, there is provided a data processing system including a host device, that includes a display unit, and a data processor communicable with the host device via a network. The data processor includes a media connecting unit, a file creating unit, a data transmitting unit, and an operation executing unit. The media connecting unit is capable of connecting a storage medium. The file creating unit creates a controlling file for controlling the storage medium. The data transmitting unit transmits data identifying the controlling file to the host device for allowing the host device to access the file. The operation executing unit executes an operation of the storage medium in response to receiving a transmission request of the controlling file. The display unit displays the data, if the host device receives the controlling file.

In another aspect of the present invention, there is provided a method of operating a data processing system. The processing system includes a host device and a data processor communicable with the host device via a network, the processor comprising a media connecting unit that is capable of connecting a storage medium. The method includes:

creating a controlling file for controlling the storage medium;

transmitting data identifying the controlling file to the host device for allowing the host device to access the file; and executing an operation of the storage medium in response to receiving a transmission request of the controlling file.

DRAWINGS

In the drawings:

FIGS. 15A and 15B are screenshots showing contents of a file Format**MemoryCard.txt in the printer according to the first embodiment;

FIG. 26 is a flowchart illustrating steps in a process for initializing the virtual directory tree on the printer according to the second embodiment;

FIGS. 27A and 27B are explanatory diagrams showing the virtual directories tree according to the second embodiment;

FIG. 28 is a flowchart illustrating steps in a cd process performed on the printer according to the second embodiment;

DETAILED DESCRIPTION

A data processing system, a data processor, and a method of operating the data processing system according to embodiments of the present invention will be described while referring to the accompanying drawings. In this embodiment, the data processing system and the data processor is applied to an FTP system and an FTP processing device, respectively. While the FTP system described below has a simple structure used for illustrating the embodiments, it should be apparent this structure can be suitably modified within the scope of the invention.

Figure 1:
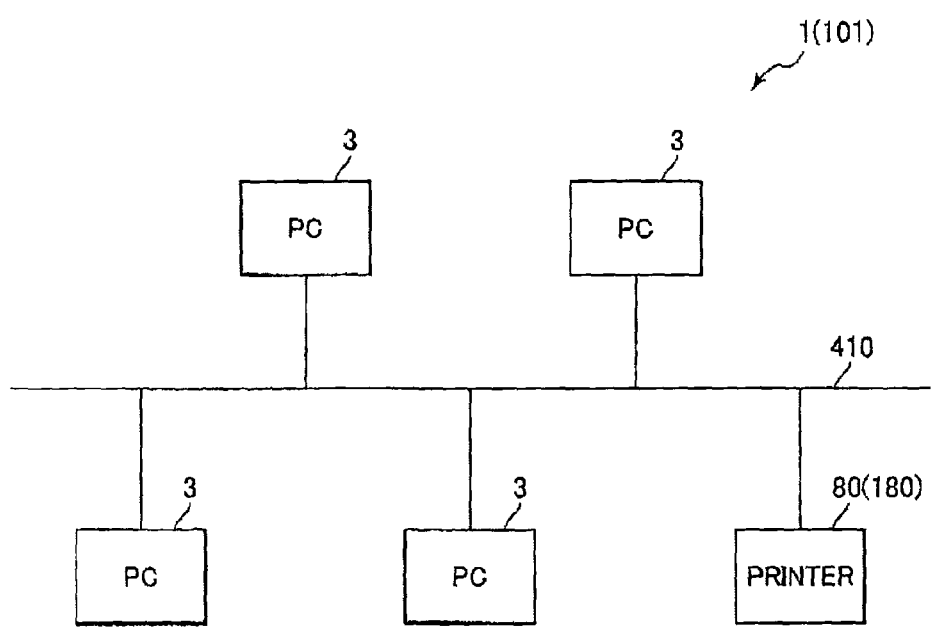
FIG. 1 is a block diagram showing an overall structure of an FTP system according to an embodiment of the present invention.

FIG. 1 is a block diagram showing an overall structure of an FTP system 1. The FTP system 1 includes a printer (an FTP processing device) 80 functioning as a network printer, a plurality of personal computers (hereinafter abbreviated as "PC") 3 serving as host devices and capable of communicating with the printer 80 via a network (LAN) 410.

The network 410 may be a wired network, as illustrated in the drawing, or a wireless network.

Figure 2:
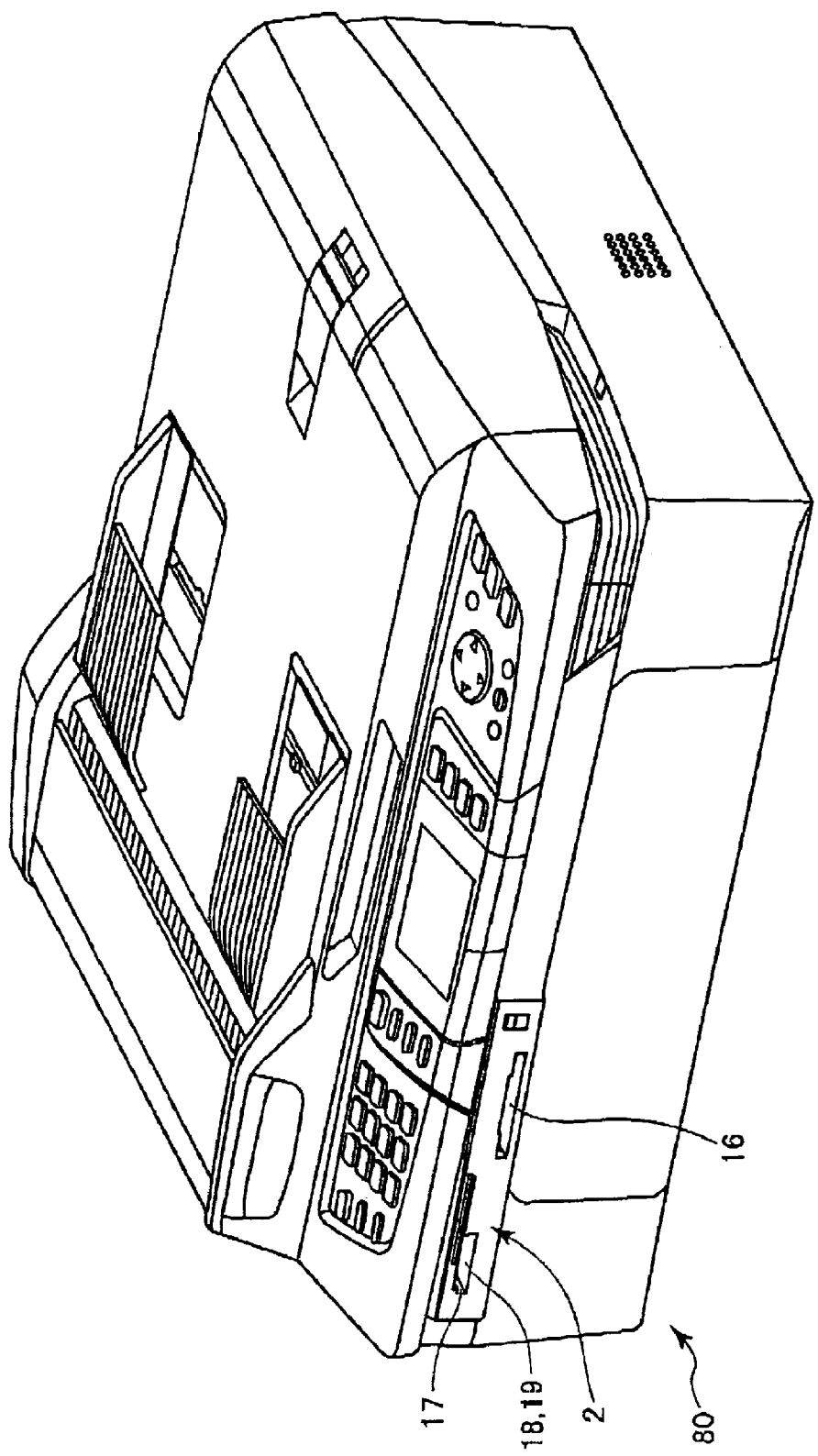
FIG. 2 is a perspective view of a printer applied to the FTP system of the embodiment.

FIG. 2 shows an outer appearance of the printer 80, which can also be referred to as a multifunction peripheral (MFP). The printer 80 is configured of a multi-reader/writer 2 incorporated in a printer and serving as an FTP processor. More specifically, the printer 80 is integrally provided with the multi-reader/writer 2 having media connection slots (hereinafter simply referred to as "slots") 16-19 exposed in a front surface of the printer 80. The printer 80 includes a printer function, scanner function, copier function, and facsimile function.

The printer 80 may include a USB connector in place of, or together with, the media connection slots, enabling USB memory to be connected to the USE connector as storage media. The printer 80 may also be provided with a wireless connector for connecting memory cards having a wireless function as storage media.

The printer 80 is connected to the PCs 3 via the network 410 and functions as a reader/writer for implementing data communications between the PCs 3 and memory cards inserted into the multi-reader/writer 2. The printer 80 also prints images and text on prescribed papers based on print data transmitted from the PCs 3. The printer 80 can also directly print images and text onto prescribed papers based on print data that the multi-reader/writer 2 reads from memory cards. The printer 80 can also transmit image data scanned by a scanning unit to the PCs 3 or copy the images read by the scanning unit using a printing unit.

The media connection slots 16-19 of the multi-reader/writer 2 shown in FIG. 2 include a first slot 16 for receiving a first memory card 11, a second slot 17 for receiving a second memory card 12, a third slot 18 for receiving a third memory card 13, and a fourth slot 19 for receiving a fourth memory card 14. The multi-reader/writer 2 may include another slot receiving another memory card such as xD picture card (registered trademark; hereinafter abbreviated as "XD").

Figure 3:
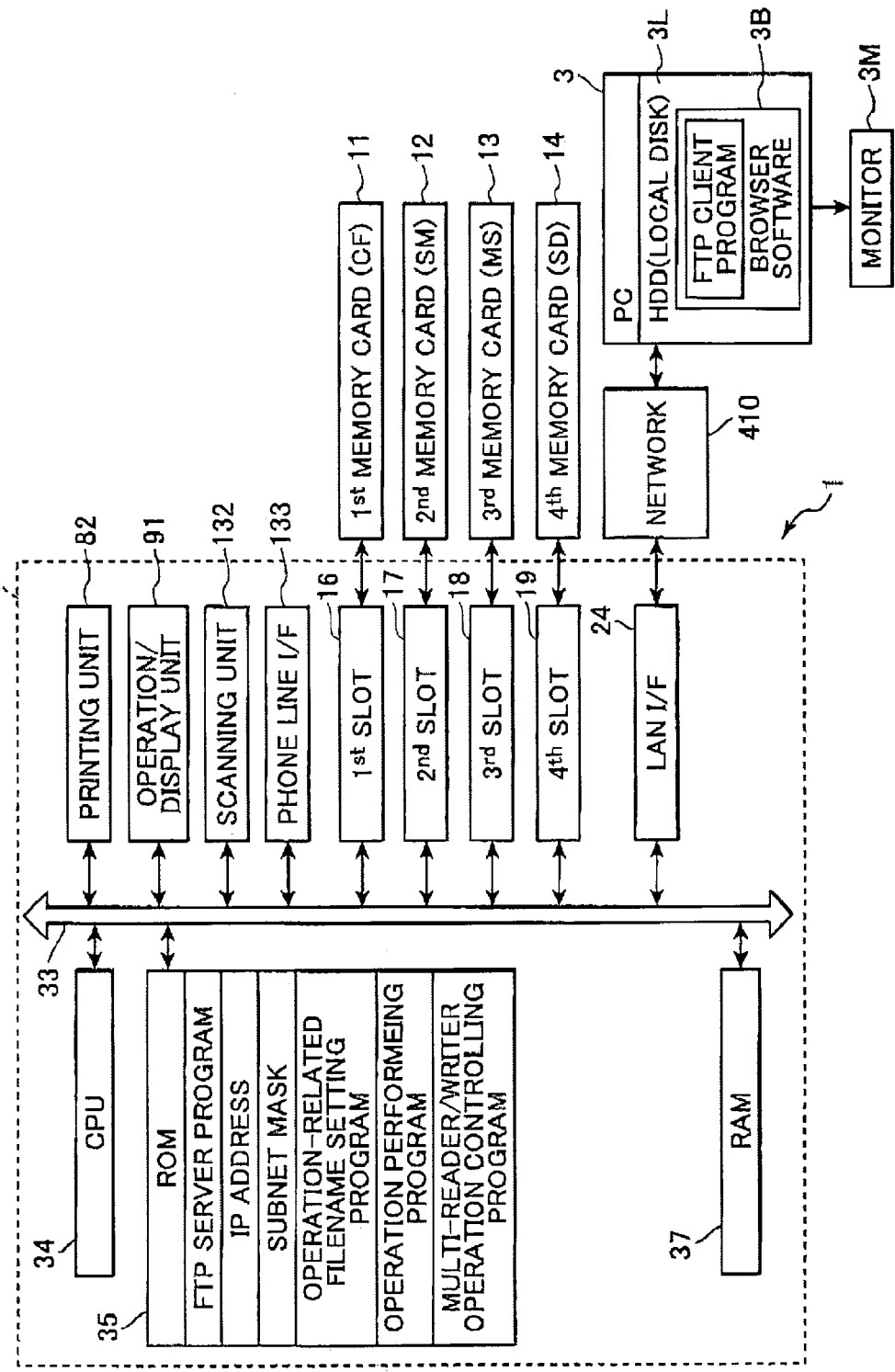
FIG. 3 is a block diagram showing an electrical structure of the printer (card reader) according to a first embodiment.

FIG. 3 is a block diagram showing an electrical structure of the printer 80. The printer 80 includes a CPU 34, a ROM 35, and a RAM 37 that are connected and capable of transferring data to each other via a bus 33. The CPU 34 controls each component of the printer 80. The ROM 35 is configured of a nonvolatile memory, such as flash memory, and functions to store control programs and various data. The RAM 37 functions as a work area for the CPU 34. The slots 16-19 are connected to the bus 33 via a flash memory control LSI. The first through fourth memory cards 11-14 detachably connected to the slots 16-19 are card-type storage media, such as the CF, SM, MS, and SD described above. The card-type storage media includes flash memory storing data in a format that can be read, written, overwritten, and deleted. Each type of memory card can be selectively connected to the respective slots 16-19.

Also connected to the bus 33 are a printing unit 32, a scanning unit 132, a phone line interface 133, and an operation/display unit 91 configured of an LCD, a keyboard, cursor-moving keys, and the like. A LAN interface 24 is also connected to the bus 33 for connecting to a PC 3 functioning as a host device via a network. A plurality of PCs 3 and the printer 80 can be connected to each other via the TCP/IP network 410 (see FIG. 1).

The ROM 35 stores a control program for controlling the operations of the multi-reader/writer 2, and various other control programs for controlling printing, scanning, and fax communications, for example. The CPU 34 controls overall operations of the multifunction peripheral by executing these programs using the RAM 37 as a work area.

The ROM 35 also stores an FTP server program; an IP address and subnet mask for identifying the printer 80 on the network 410; a program for setting an operation-related filename; and an operation performing program.

The memory cards (storage media) 11-14 are connected to the slots 16-19. The PC 3 also includes a local disk 3L configured of a hard disk or the like, and a monitor 3M configured of a liquid crystal display or the like. A browser 3B including an FTP client program is installed on the local disk 3L.

The CPU 34 executes the various control programs described above, the program for setting the status-reflecting filename, and the FTP server program on the printer 60 in order to implement the FTP server function, operation-related filename setting function, and operation performing function.

Next, a sequence of data transfers on the FTP system 1 will be described with reference to FIG. 4. The sequence shown in FIG. 4 begins when the user of the PC 3 launches a browser 3B incorporated in the FTP client function and begins accessing the printer 80 when the user inputs a node name of the printer 80 "ftp://brn_600789." If a shortcut for the node name "ftp://brn_600789" is provided on the PC 3 side, the user may access the printer 60 directly by double-clicking on the shortcut to launch the browser.

First, in J1 the PC 3 (FTP client) connects to port 21 assigned to the FTP server in order to access the printer 80 (FTP server). In J2 the printer 80 transmits a username request to the PC 3. After receiving the request in J3, the PC 3 transmits the username to the printer 80 for logging in to the FTP server.

In J4 the printer 80 transmits a password request to the PC 3 and, upon receiving this password request, in J5 the PC 3 transmits a password inputted on the host device to the printer 80. The printer 80 performs user authentication for the login user based on the username and password received from the PC 3, and in J6 returns a response to the PC 3 allowing the login user to log onto the FTP server (printer 80) if authentication was accepted.

Once the user is allowed to login to the FTP server, in J7 the PC 3 issues a cd (change directory root) command to the printer 80 requesting access to the root directory. In J8 the printer 80 accesses the root directory (attempts to change the current directory to the root directory) and returns a code to the PC 3 indicating the change was successful.

If the printer 80 was unable to access the root directory, the printer 80 returns a code indicating this failure (the response code "550" and the like). However, in this embodiment, the printer 80 is configured to return a code to the PC 3 indicating that the root directory was successfully accessed, even when the storage media was not connected.

Upon receiving the code indicating that the root directory was successfully accessed, in J9 the PC 3 issues a list command for the root directory. Receiving the list command, in J10 the printer 80 transmits data to the PC 3. The data indicates an existence of a file and a status of the media connector. The file has an operation-related filename set by the program for setting the operation-related filename in FIG. 3.

Figure 5:
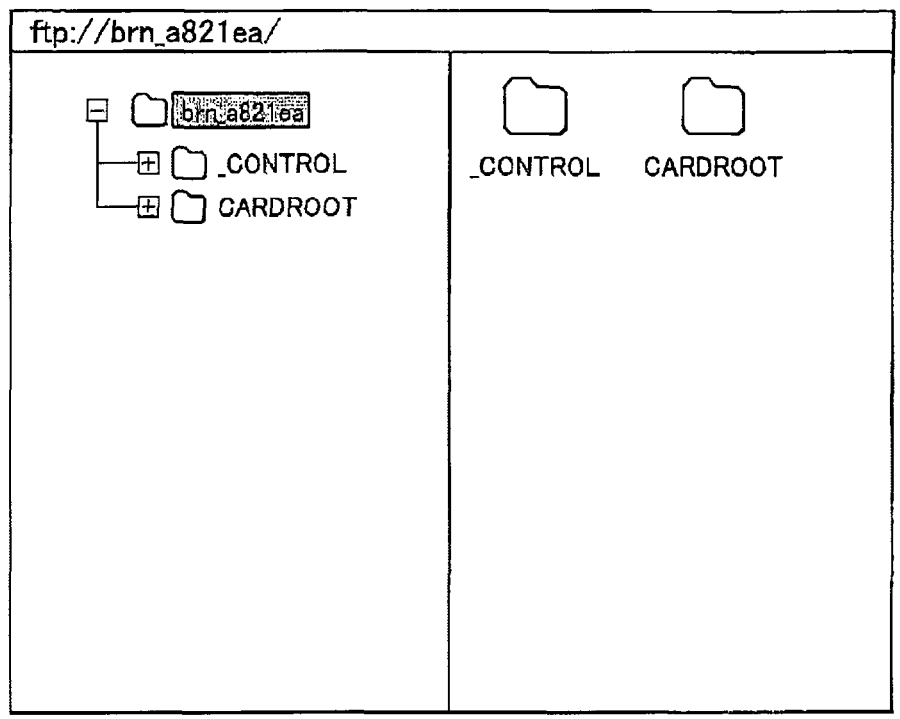
FIG. 5 is a screenshot of a virtual directory in the embodiment.

In the embodiment, the printer 80 notifies the PC 3 that a _CONTROL directory exists in the root directory, even though this is not true. Upon receiving this notification, the PC 3 displays the window shown in FIG. 5 indicating that the _CONTROL directory exists in the root directory.

The printer 80 issues a notification to the PC. The notification indicates that a file exists in the _CONTROL directory having an operation-related filename that enables the user to perform an operation on media.

Figure 6:
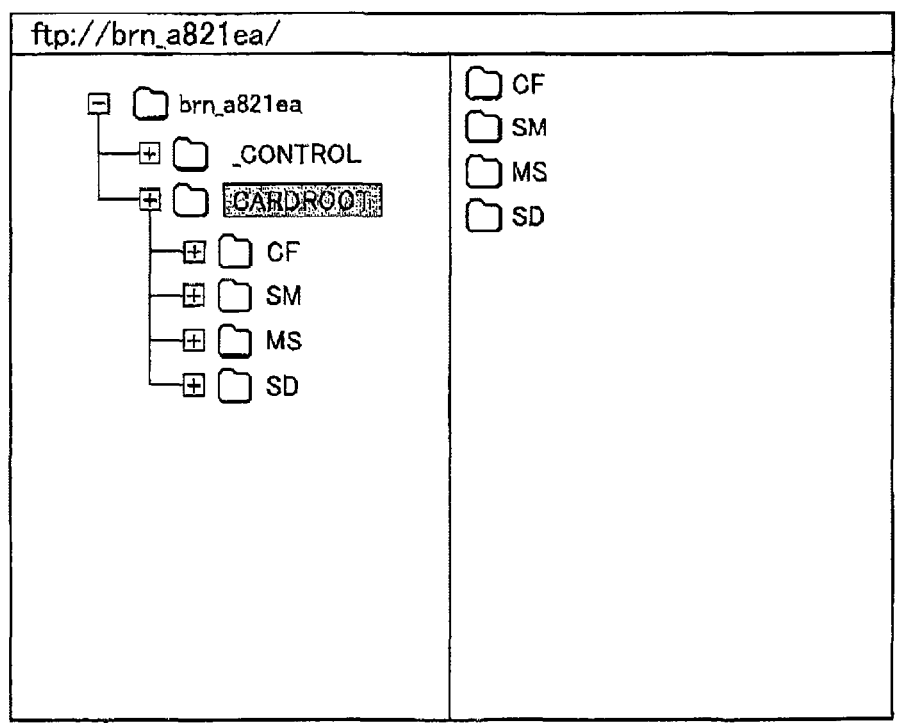
FIG. 6 is a screenshot of a list of files and directories in storage media connected to the printer according to the embodiment.

As shown in FIG. 6, directories having the names CF, SM, MS, and SD corresponding to the respective media slots are provided in the CARDROOT directory. The directories may be named arbitrarily for the corresponding media.

Further, the directory name corresponding to each slot is determined based on results of detecting what types of slots are provided in the FTP server. Fixed directory names may be set for each slot if the slots provided in the FTP server are fixed.

Further, in response to the list command described above, the printer 80 also transmits data indicating an existence of a directory having the directory name "CARDROOT". Upon receiving this data, the PC 3 displays the directory name "CARDROOT" with an icon. The printer 80 sets this directory name to the directory name specifying the highest directory in the storage media and transmits the directory name to the PC 3. If the PC 3 requests access to this directory in response to the user opening the directory (specifically, if the PC 3 consecutively transmits "cd/CARDROOT" and the list command), the printer 80 returns filenames for all files stored in the highest directory of the storage media to the PC 3. The PC 3 then displays a list of these files in the connected storage media, as shown in FIG. 6.

FIGS. 7 through 14 and FIGS. 16 through 20 are flowcharts illustrating steps in an FTP server process that the CPU 34 of the printer 80 executes based on an FTP server program. The FTP server process begins when the printer 80 is started.

Figure 7:
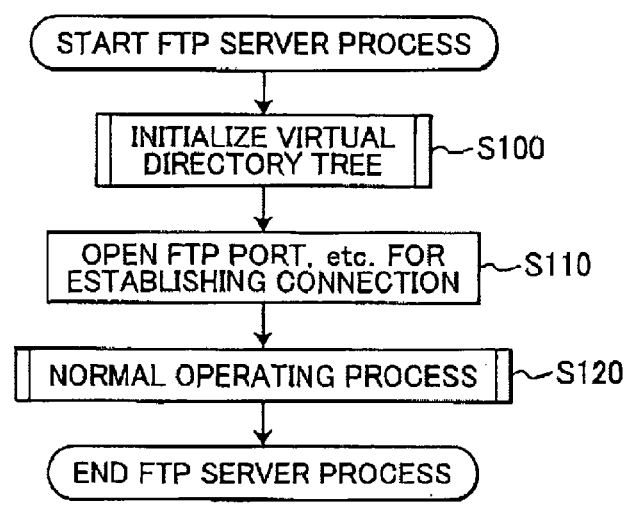
FIG. 7 is a flowchart illustrating steps in an FTP server process performed on the printer according to the embodiment.

In S100 of the FTP server process shown in FIG. 7, the CPU 34 performs a process to initialize a virtual directory tree, forming a directory tree to be managed by the CPU 34 in the FTP server process in the RAM 37 or the like. In S110 the CPU 34 performs preparations, such as opening an FTP port, in order to connect to a network device as an FTP server. In S120 the CPU 34 executes normal operating processes, as an FTP server, such as receiving requests to access files and responding to these requests. The CPU 34 continues to execute normal operating processes until the power to the printer 80 is interrupted, the printer 80 is reset, or the like.

Figure 8:
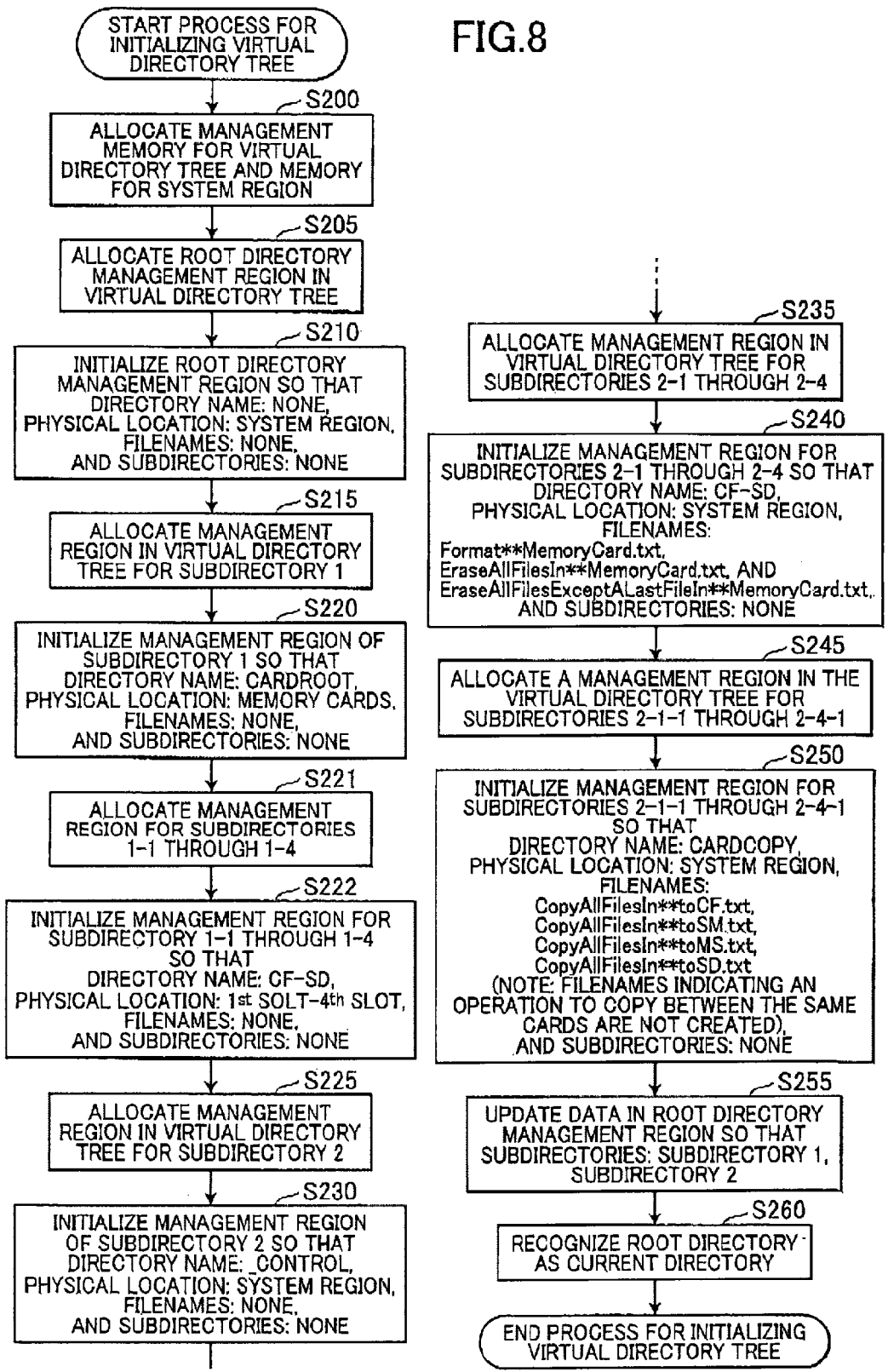
FIG. 8 is a flowchart illustrating steps in a process for initializing a virtual directory tree in the printer according to the embodiment.

FIG. 8 is a flowchart illustrating steps in the process for initializing the virtual directory tree in S100 of FIG. 7.

In S200 of FIG. 8, the CPU 34 allocates in the RAM 37 or the like an amount of memory required for managing the structure of the virtual directory tree, and an amount of memory required for managing the FTP server system.

In S205 the CPU 34 allocates a region for managing the root directory of the FTP server in the virtual directory tree formed in memory such as the RAM 37. In S210 the CPU 34 initializes the allocated region for managing the root directory. Specifically, the CPU 34 sets attributes for the management region indicating that there is no directory name, that the physical location of the directory is in a system region described later, that there are no filenames for files stored in the directory (i.e., the directory contains no files), and that there are no subdirectories. The system region is a region of memory (the RAM 37) allocated in the process for initializing the virtual directory tree.

In S215 the CPU 34 allocates a region for managing a subdirectory 1 in the memory allocated for the virtual directory tree.

In S220 the CPU 34 initializes the region allocated for managing the subdirectory 1. Specifically, the CPU 34 sets attributes for the management region indicating that the directory name is CARDROOT, physical location of the directory is whole of the memory cards, there are no filenames for files stored in the directory (i.e., the directory has no files), and the directory has no subdirectories.

Next, in S221 the CPU 34 allocates a region for managing subdirectories 1-1~1-4 in the memory allocated for the virtual directory tree. Subsequently, in S222 the CPU 34 initializes the region allocated for managing the subdirectory 1-1~1-4. Specifically, the CPU 34 sets attributes for the management region indicating that the names of the directories are CF, SM, MS, and SD, physical locations of the directories are in the first slot 16 through fourth slot 20, there are no filenames for files stored in the directory (i.e., the directory has no files), and the directory has no subdirectories.

In S225 the CPU 34 allocates a region for managing a subdirectory 2 in the memory allocated for the virtual directory tree.

In S230 the CPU 34 initializes the region for managing subdirectory 2. Specifically, the CPU 34 sets attributes for the management region indicating that the name of the directory is _CONTROL, that physical locations of the directories are in the system region, that there are no filenames for files stored in the directory (i.e., the directory has no files), and that the directory has no subdirectories. In S235 the CPU 34 allocates a region for managing subdirectories 2-1 through 2-4 in the memory allocated for the virtual directory tree.

In S240 the CPU 34 initializes the allocated region for managing the subdirectories 2-1 through 2-4. Specifically, the CPU 34 sets attributes for the management region indicating that the names of the directories are CF, SM, MS, and SD; that physical locations of the directories are in the system region; that the filenames of files stored in the directories are FormatMemoryCard.txt, EraseAllFilesInMemoryCard.txt, and EraseAllFilesExceptALastFileInMemoryCard.txt (where a character string representing the storage media, such as CF, SM, MS, and SD, is inserted in place of ""); and that the directory has no subdirectories.

In S245 the CPU 34 allocates a region for managing subdirectories 2-1-1 through 2-4-1 in the allocated memory area for the virtual directory tree.

In S250 the CPU 34 initializes the allocated management region for the subdirectories 2-1-1 through 2-4-1. Specifically, the CPU 34 sets attributes for the management region indicating that the name of the directory is CARDOCOPY; that physical locations of the directories are in the system region; that the filenames for files stored in the directory are CopyAllFilesIntoCF.txt, CopyAllFilesIntoSM.txt, CopyAllFilesIntoMS.txt, and CopyAllFilesIntoSD.txt (where a character string representing the storage media, such as CF, MS, SD, and SM, is inserted in place of "**"); and that the directory has no subdirectories.

In S255, the CPU 34 updates the allocated management region for the root directory. Specifically, the CPU 34 sets subdirectory data to subdirectory 1 and subdirectory 2 so that the two directories CARDROOT and _CONTROL are recognized in the root directory.

In S260 the CPU 34 confirms that the root directory is set as the current directory. By making this recognition, the printer 80 can return filenames for files and subdirectory names for subdirectories within the root directory, which is the current directory, when an FTP client (hereinafter simply referred to as "client") accessing the FTP server transmits a list command without specifying "cd/".

Figure 22:
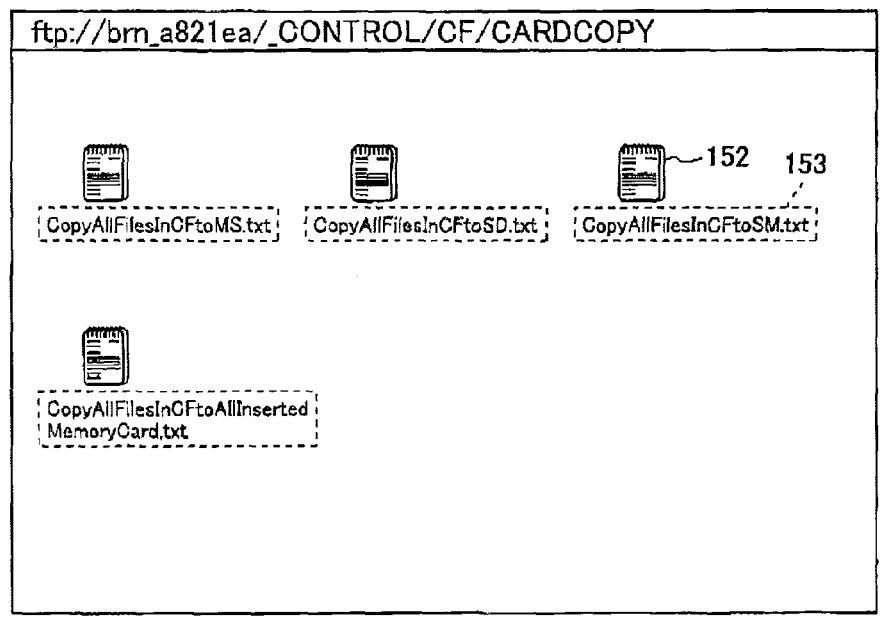
FIG. 22 is a screenshot showing contents of a CARDCOPY directory in a subdirectory 2-1-1 on the printer according to the first embodiment.

FIG. 22 is an explanatory diagram showing a virtual directory tree configured in the process for initializing the virtual directory tree described above. A conceptual drawing of the system region corresponding to the memory allocated in the process for initializing the virtual directory tree has been omitted from the drawing.

Figure 9:
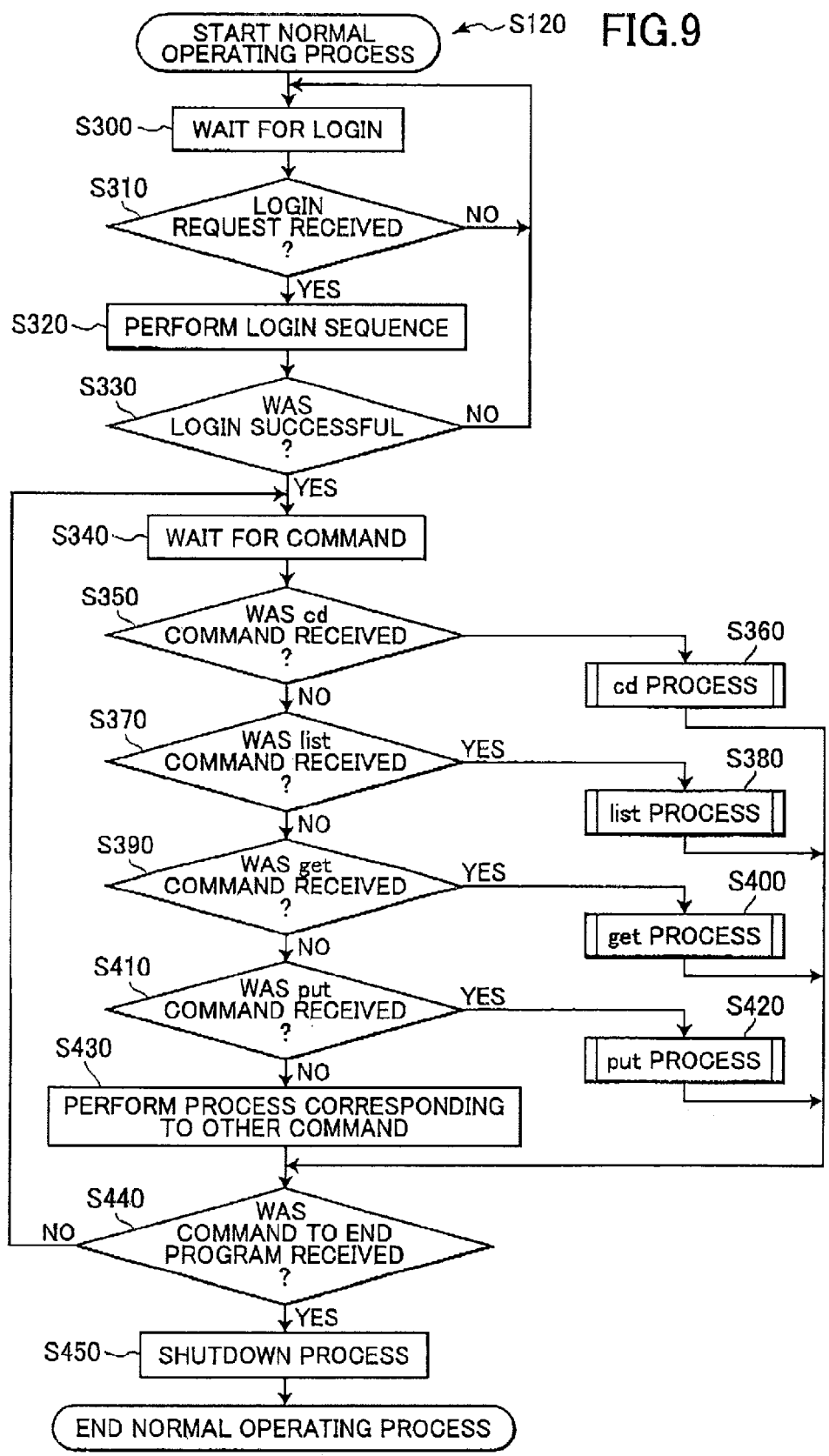
FIG. 9 is a flowchart illustrating steps in a normal operating process performed on the printer according to the embodiment.

FIG. 9 is a flowchart illustrating steps in the normal operation process of S120 in FIG. 7. After completing initialization as the FTP server, in S300 the CPU 34 enters a login wait state to wait for a client to login (see J1 of FIG. 4).

The CPU 34 remains in the login wait state while a login request has not been received from a client (S310: NO). When a login request has been received from a client (S310: YES), in S320 the CPU 34 executes a login sequence (see J2-J5 of FIG. 4).

If the login sequence failed (S330: NO), the CPU 34 once again enters the login wait state. However, if the login sequence was successful (S330: YES), then in S340 the CPU 34 transmits a code to the client indicating that login was successful (see J6 of FIG. 4) and enters a command wait state to wait for an FTP command from the client.

If a cd command was received from the client (S350: YES), then in S360 the CPU 34 executes a cd process in response to the cd command. For example, when the client double-clicks a folder of a prescribed directory, the cd command is issued from the PC 3 to the printer 80. If a list command was received from the client (S370: YES), then in S380 the CPU 34 executes a list process in response to the list command. For example, when the client double-clicks a folder of a prescribed directory, the list command is issued from the PC 3 to the printer 80, following the cd command. If a get command was received from the client (S390: YES), then in S400 the CPU 34 executes a get process in response to the get command. If a put command was received from the client (S410: YES), then in S420 the CPU 34 executes a put process in response to the put command. For example, when the client moves another prescribed file to another prescribed directory, the put command is issued from the PC 3 to the printer 80. If another command was received from the client, then in S430 the CPU 34 executes a process corresponding to the another command.

After executing the above processes or if a command was not received from the client, in S440 the CPU 34 determines whether a shutdown process on the printer 80 or another indication to end the program has been received.

If no command has been given to end the program (S440: NO), then the CPU 34 reenters the command wait state. However, if a command has been issued to end the program (S440: YES), then in S450 the CPU 34 performs a shutdown process to end its function as the FTP server, thereby ending the normal operation process.

Figure 10:
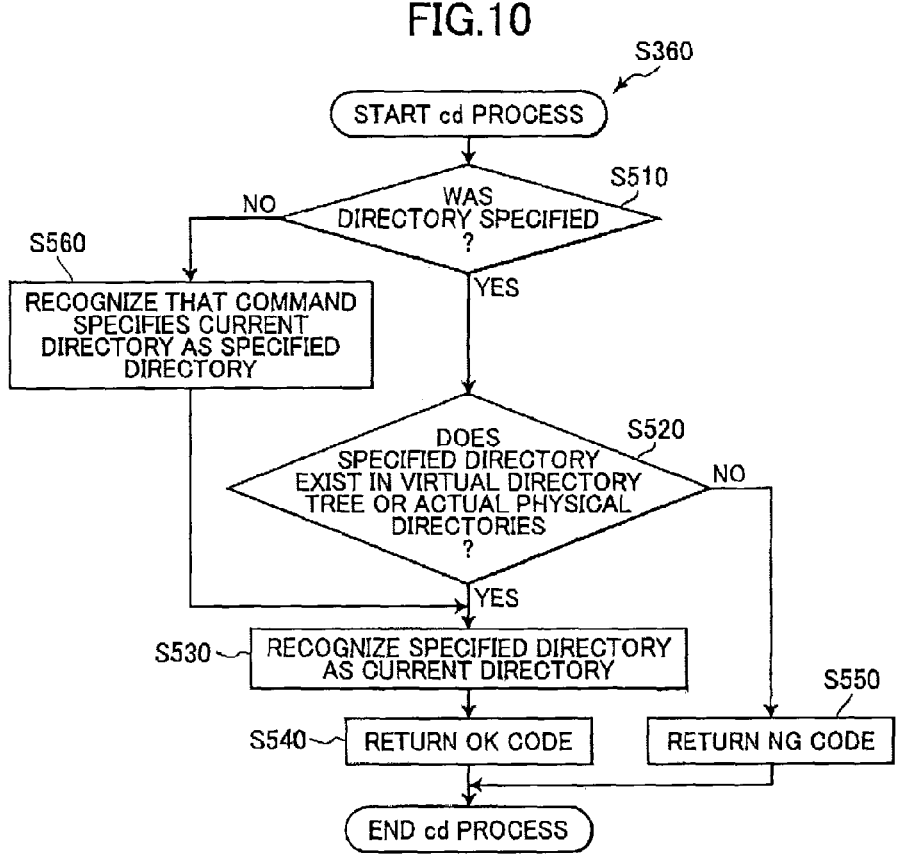
FIG. 10 is a flowchart illustrating steps in a cd process performed on the printer according to the first embodiment.

FIG. 10 is a flowchart illustrating steps in the cd process of S360 in FIG. 9. The cd process functions to recognize the directory specified in the cd command as the current directory (i.e., to switch the current directory).

In S510 the CPU 34 determines whether the command specifies a target directory. If a directory has been specified (S510: YES), then in S520 the CPU 34 determines whether the directory specified in the command received from the client exists in the virtual directory tree or in the actual physical directories (a storage media or other storage device).

If the specified directory exists in the virtual directory tree or in the actual physical directories (S520: YES), then in S530 the CPU 34 recognizes the specified directory as the current directory and in S540 transmits an OK code to the client indicating that the process was successful. Subsequently, the CPU 34 ends the cd process.

The directory specified in the cd command continues to be recognized as the current directory throughout the FTP server process unless the current directory is again switched.

However, if the specified directory does not exist in the virtual directory tree nor in the actual physical directories (S520: NO), in S550 the CPU 34 transmits a failure code (NG code) to the client indicating that the process failed, without changing the current directory to the specified directory. Subsequently, the ROM 35 ends the cd process.

Further, if the command does not specify a target directory (S510: NO), in S560 the CPU 34 recognizes that the command specifies the current directory as the specified directory and executes the process from S530.

Figure 11:
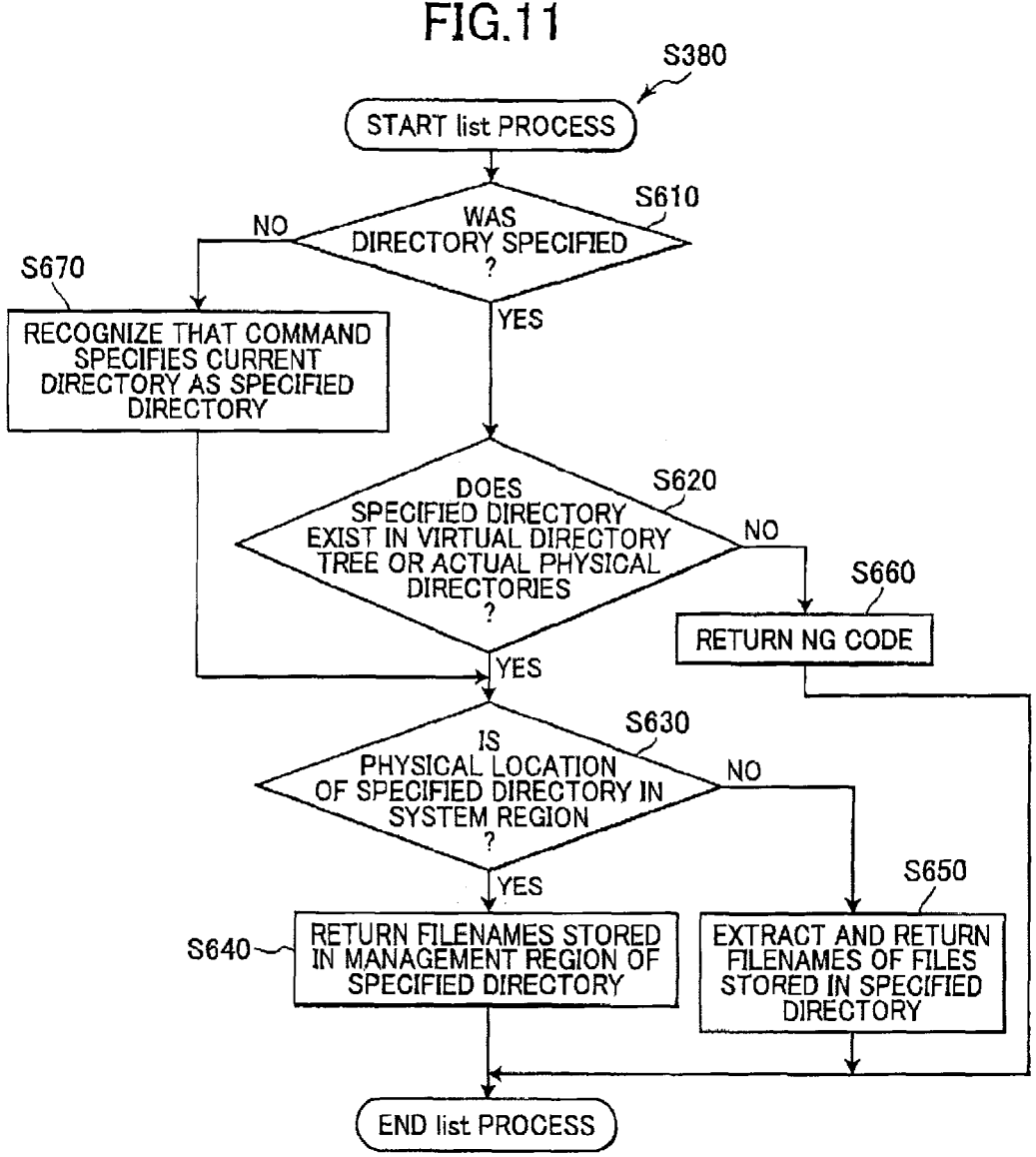
FIG. 11 is a flowchart illustrating steps in a list process performed on the printer according to the first embodiment.

FIG. 11 is a flowchart illustrating steps in the list process of S380 in FIG. 9. The list process serves to return to the client filenames of files and directory names of directories (subdirectory names of subdirectories) located in the directory specified in the list command, i.e., to provide the client with a list of files and directories in the client-specified directory.

In S610 the CPU 34 determines whether the command specifies a target directory. If a target directory is specified (S610: YES), then in S620 the CPU 34 determines whether the directory specified by the client in the command is in the virtual directory tree or in the actual physical directories.

If the specified directory is in the virtual directory tree or the actual physical directories (S620: YES), in S630 the CPU 34 determines whether the physical location of the specified directory exists in the system region. If the physical location of the specified directory is in the system region (the virtual directory tree) (S630: YES), then in S640 the CPU 34 transmits the filenames and subdirectory names stored in the region for managing the specified directory to the client and subsequently ends the list process. In other words, the CPU 34 transmits to the client filenames that are special in this embodiment, such as a filename indicating the status of the printer 80 and the storage media connected to the printer 80.

On the other hand, if the physical location of the specified directory is not in the system region, i.e., is in the storage media or other storage device (S630: NO), then in S650 the CPU 34 extracts and transmits the filenames and subdirectory names stored in the specified directory to the client, and subsequently ends the list process. In other words, the CPU 34 transmits filenames of the files and directory names of directories actually stored in the storage media or the like. If the client issues a list command for the root directory, the CPU 34 transmits filenames of the files and directory names of directories.

If the specified directory does not exist in the virtual directory tree nor in the actual physical directories (S620: NO), then in S660 the CPU 34 transmits a failure code to the client indicating that the process failed, and subsequently ends the list process.

Further, if the command does not specify the target directory (S610: NO), in S670 the CPU 34 recognizes that the command specifies the current directory as the specified directory and executes the process from S630.

Figure 12:
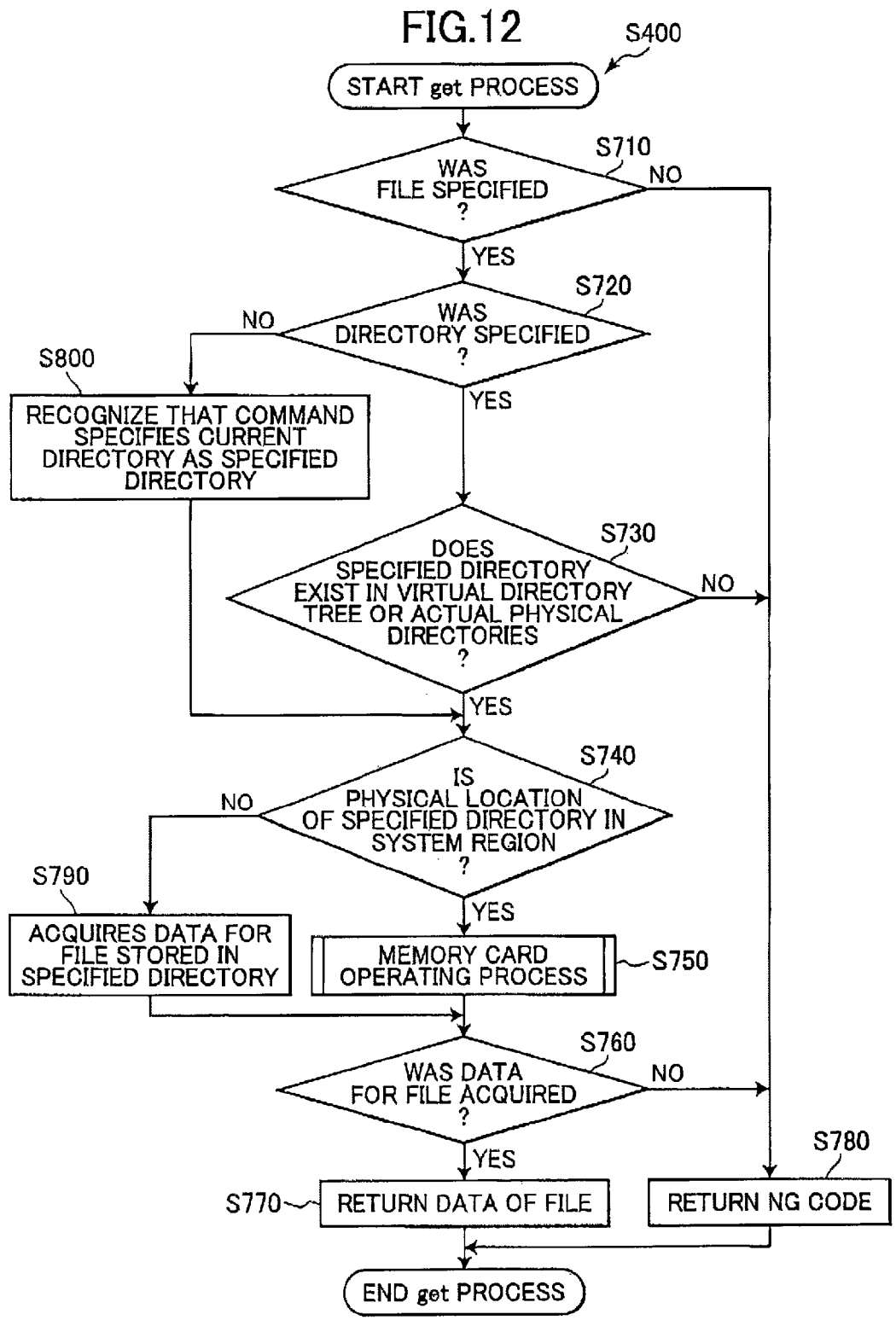
FIG. 12 is a flowchart illustrating steps in a get process performed on the printer according to the first embodiment.

FIG. 12 is a flowchart illustrating steps in the get process of S400 in FIG. 9. The get process functions to return data for the file specified in a get command to the client, i.e., to provide the client with the data of the client-specified file.

In S710 the CPU 34 determines whether the command specifies a target file. If a target file is specified (S710: YES), in S720 the CPU 34 determines whether the command specifies the directory in which the target file exists (the location of the target directory).

If the command specifies the target directory (S720: YES), then in S730 the CPU 34 determines whether the directory specified by the client exists in the virtual directory tree or in the actual physical directories. If the specified directory exists in the virtual directory tree or in the actual physical directories (S730: YES), then in S740 the CPU 34 determines whether the physical location of the specified directory is within the system region (virtual directory tree).

If the physical location of the specified directory lies within the system region (S740: YES), then in S750 the CPU 34 executes a memory card operating process.

In S760 the CPU 34 determines whether the data of the file was acquired. If the data of the file could be acquired (S760: YES), in S770 the CPU 34 transmits the data to the client and subsequently ends the get process. In other words, the CPU 34 transmits data of a file special to this embodiment to the client, including a file indicating the status of the printer 80 and the statuses of storage media connected to the printer 80.

However, if data for the file could not be acquired (S760: NO), in S780 the CPU 34 transmits a failure code to the client indicating that the process failed, and subsequently ends the get process.

Further, if the CPU 34 determines in S740 that the physical location of the specified directory does not exist in the system region, i.e., is in the storage media or other storage device (actual physical directories) (S740: NO), in S790 the CPU 34 acquires data for the file stored in the specified directory and continues from S760 described above. In other words, the CPU 34 transmits the data for the files actually stored in the storage media.

Further, if the CPU 34 determines in S730 that the specified directory does not exist in the virtual directory tree nor in the actual physical directories (S730: NO), in S780 the CPU 34 transmits a failure code to the client indicating that the process failed, and subsequently ends the get process.

Further, if the CPU 34 determines in S720 that the command does not specify a target directory (S720: NO), in S800 the CPU 34 recognizes that the command specifies the current directory as the specified directory, and continues the process from S740.

Further, if the CPU 34 determines in S710 that the command does not specify a target file (S710: NO), in S780 the CPU 34 transmits a failure code to the client indicating that the process failed, and subsequently ends the get process.

Figure 13:
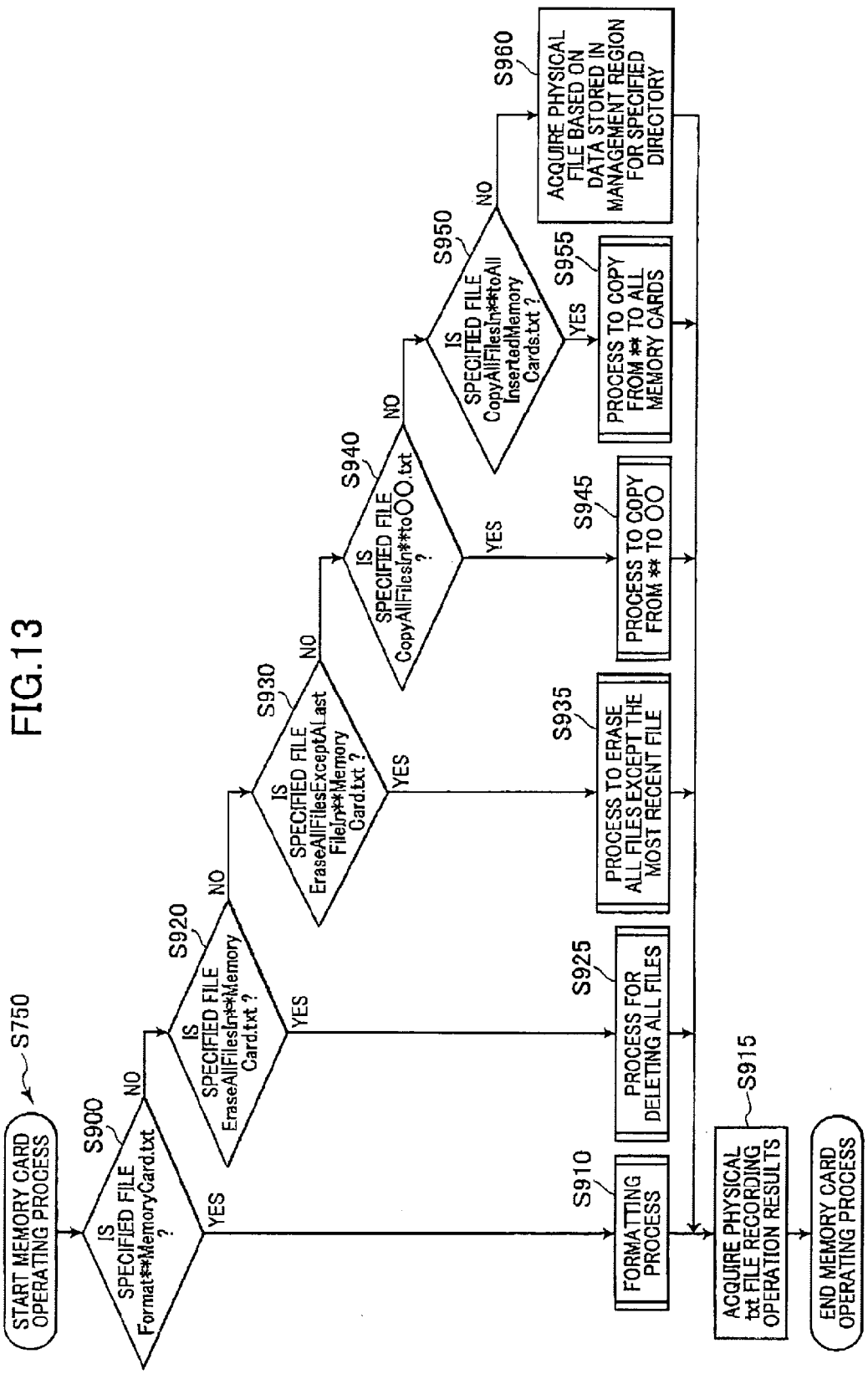
FIG. 13 is a flowchart illustrating steps in a memory card operating process performed on the printer according to the first embodiment.

FIG. 13 is a flowchart illustrating steps in the memory card operating process of S750 in FIG. 12. The memory card operating process implements an operation on a memory card (such as a format operation, an operation to delete files from a memory card, and the like) based on a specified file and transmits a file describing the results of the operation to the client. At the beginning of the process, the CPU 34 determines the type of the specified file.

In S900 the CPU 34 determines whether the specified file is FormatMemoryCard.txt. When the client double-clicks an icon for the file FormatMemoryCard.txt at the PC 3 (S900: YES), in S910 the CPU 34 performs a formatting operation (format starting operation) on the memory card specified in place of "". In S915 the CPU 34 acquires a physical txt file describing the operation results, and subsequently ends the memory card operating process. Example of operation results written to the file FormatMemoryCard.txt is "Format of the memory card is completed." Regardless of whether the operation performed was a formatting operation, the CPU 34 transmits the physical txt file acquired in S915 to the client in S770 of FIG. 12. Further, the filename for the specified file in the memory card operating process is not limited to this example, but may be modified as appropriate.

In 920 the CPU 34 determines whether the specified file is EraseAllFilesInMemoryCard.txt. If the client double-clicks an icon for the file EraseAllFilesInMemoryCard.txt at the PC 3 (S920: YES), in S925 the CPU 34 performs an operating process to delete all files from the memory card specified in place of "**", in S915 acquires a physical txt file describing the operation results, and subsequently ends the memory card operating process. The CPU 34 transmits the physical txt file acquired in S915 to the client in S770 of FIG. 12. Here, the filename of the file specified in the memory card operating process may be modified as appropriate.

In 930 the CPU 34 determines whether the specified file is EraseAllFilesExceptALastFileInMemoryCard.txt. If the client double-clicks an icon for the file EraseAllFilesExceptALastFileInMemoryCard.txt at the PC 3 (S930: YES), then in S935 the CPU 34 performs an operating process to delete all files in the memory card specified by "**" except the most recent file, in S915 acquires a physical txt file describing the operation results, and ends the memory card operating process. The CPU 34 transmits the physical txt file acquired in S915 to the client in S770 of FIG. 12. Again, the filename of the file specified in the memory card operating process may be modified as necessary.

In 940 the CPU 34 determines whether the specified file is CopyAllFilesInto○○MemoryCard.txt. If the client double-clicks an icon for the file CopyAllFilesInto○○MemoryCard.txt at the PC 3 (where character strings representing storage media, such as CF, SM, MS, and SD, are inserted into "" and "○○"; S940: YES), in S945 the CPU 34 performs an operating process to copy data from the memory card specified in "" to the memory card specified in "○○", in S915 acquires a physical txt file describing the operation results, and subsequently ends the memory card operating process. The CPU 34 transmits the physical txt file acquired in S915 to the client in S770 of FIG. 12. Again, the filenames of files specified in the memory card operating process are not limited to the above example.

In 950 the CPU 34 determines whether the specified file is CopyAllFilesIntoAllInsertedMemoryCards.txt. If the client double-clicks an icon for the file CopyAllFilesIntoAllInsertedMemoryCards.txt at the PC 3 (S950; YES), then in S955 the CPU 34 performs an operating process to copy data from the memory card specified in to all memory cards connected to the slots 16-19, in S915 acquires a physical txt file describing the operation results, and subsequently ends the memory card operating process. The CPU 34 transmits the physical txt file acquired in S915 to the client in S770 of FIG. 12. Again, the filenames of files specified in the memory card operating process are not limited to the above example.

The physical txt file transmitted to the client in S770 is displayed on the monitor 3M of the PC 3. For example, an application for displaying text data is activated and the physical txt file is displayed on a window on the monitor 3M.

If the specified file does not match any of the operation-related filenames defined for file operations (S950: NO), then in S960 the CPU 34 acquires a physical file based on data stored in the management region of the specified directory. Subsequently, in S915 the CPU 34 acquires a physical txt file describing the operation results and ends the memory card operating process.

Figure 14:
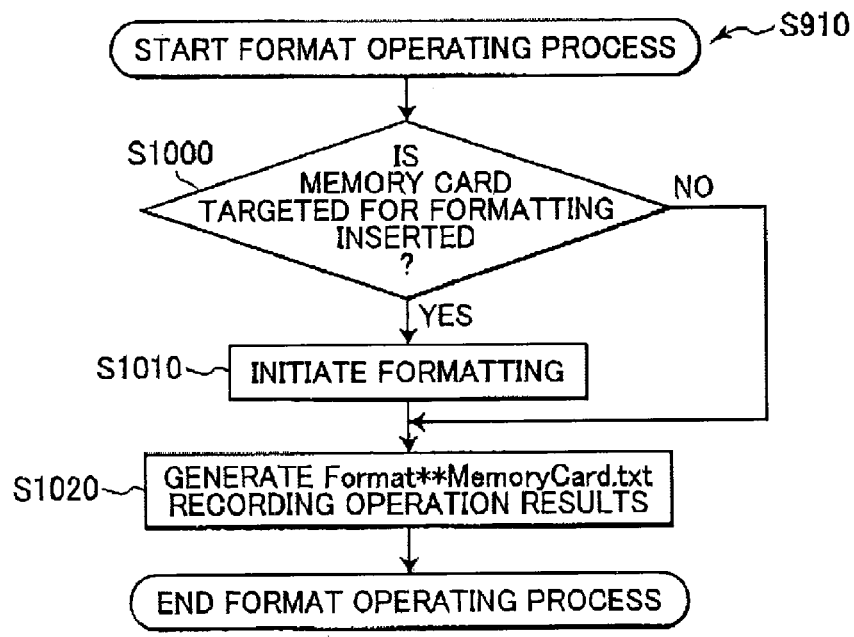
FIG. 14 is a flowchart illustrating steps in a format operating process performed on the printer according to the first embodiment.

FIG. 14 is a flowchart illustrating steps in the formatting operation in S910 of FIG. 13. In S1000 of this process, the CPU 34 determines whether a memory card targeted for formatting is connected. If the memory card is connected (S1000: YES), in S1010 the CPU 34 starts to format the memory card. In S1020 the CPU 34 generates a file with the filename FormatMemoryCard.txt indicating that formatting is in progress, and subsequently ends the format operating process. However, if a memory card is not connected (S1000: NO), then in S1020 the CPU 34 generates a file with the filename FormatMemorycard.txt indicating that a memory card is not connected, and subsequently ends the format operating process. Here, the CPU 34 generates the FormatMemoryCard.txt file and quits the format operating process without waiting for the formatting operation to be completed, thereby enabling the CPU 34 to return a response to the client for a get command within a short time so that the client does not receive a timeout error. FIGS. 15A and 15B show samples of contents in the FormatMemoryCard-txt file, where FIG. 15A shows the contents of the file when formatting has begun, and FIG. 15B shows the contents when a memory card is not connected.

Figure 16:
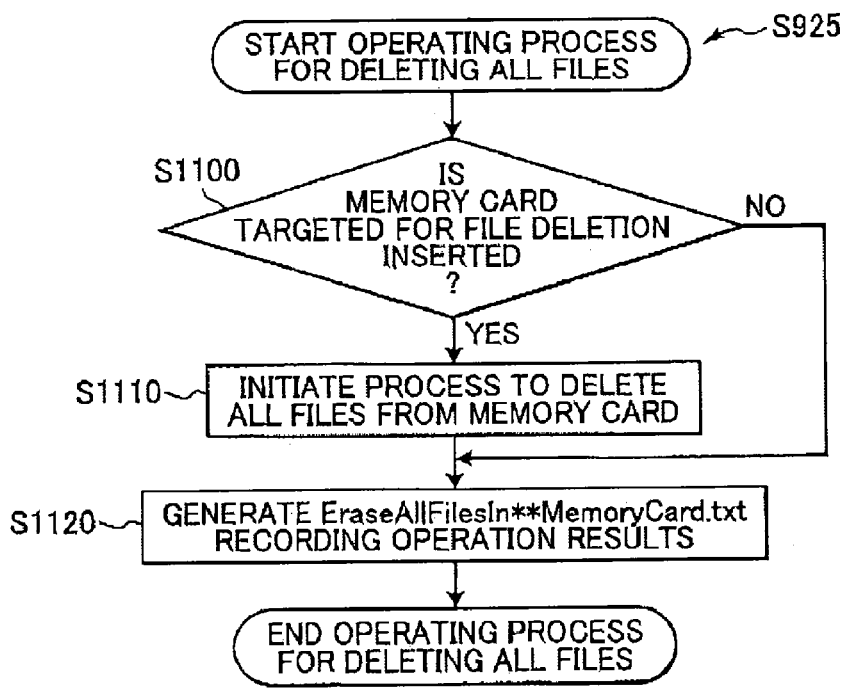
FIG. 16 is a flowchart illustrating steps in an operating process for deleting all files performed on the printer according to the first embodiment.

FIG. 16 is a flowchart illustrating steps in the operating process to delete all files in S925 of FIG. 13. In S1100 at the beginning of this process, the CPU 34 determines whether a memory card whose files are to be deleted is connected. If the memory card is connected (S1100: YES), in S1110 the CPU 34 deletes all files from the memory card. In S1120 the CPU 34 generates an EraseAllFilesInMemoryCard.txt file indicating that the process to delete all files has been begun, and subsequently ends the process to delete all files. Again, the CPU 34 generates the EraseAllFilesInMemoryCard.txt file and quits the operating process to delete all files without waiting for the deletion process to complete, thereby enabling the CPU 34 to return a response to the client for a get command within a short amount of time so that the client does not receive a timeout error. However, if the memory card is not connected (S1100: NO), then in S1120 the CPU 34 generates the EraseAllFilesIn**MemoryCard.txt file indicating that a memory card is not connected, and ends the process to delete all files.

Figure 17:
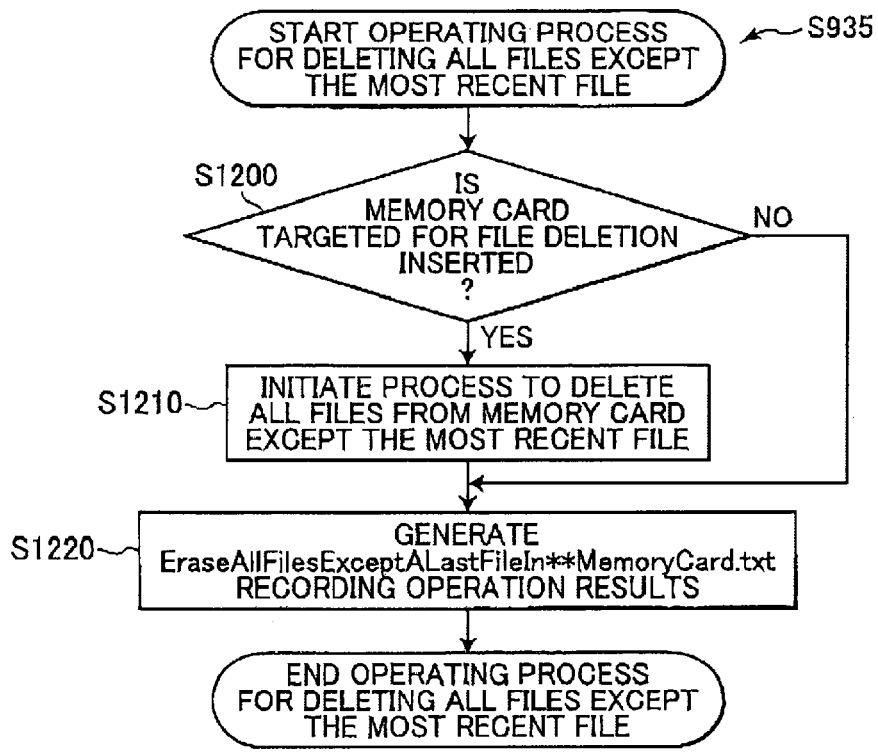
FIG. 17 is a flowchart illustrating steps in an operating process for deleting all files except the most recent file performed on the printer according to the first embodiment.

FIG. 17 is a flowchart illustrating steps in an operating process for deleting all files except the most recent file in S935 of FIG. 13. In S1200 at the beginning of this operating process the CPU 34 determines whether a memory card from which files are to be deleted is connected. If the memory card is connected (S1200: YES), in S1210 the CPU 34 deletes all files from the memory card except the most recent file. In S1220 the CPU 34 generates an EraseAllFilesExceptALastFileIn**MemoryCard.txt file indicating that the operating process to delete all files excluding the most recent file is underway, and subsequently quits the operating process.

As described above, the CPU 34 quits the operating process to delete all files excluding the most recent file after generating the EraseAllFilesExceptALastFileInMemoryCard.txt, without waiting for the deletion process to complete, thereby enabling the CPU 34 to respond to the client for a get command within a short time so that the client does not receive a timeout error. However, if the memory card is not connected (S1200: NO), then in S1220 the CPU 34 generates the EraseAllFilesExceptALastFileInMemoryCard.txt file indicating that a memory card is not connected, and subsequently ends the deletion process.

Figure 18:
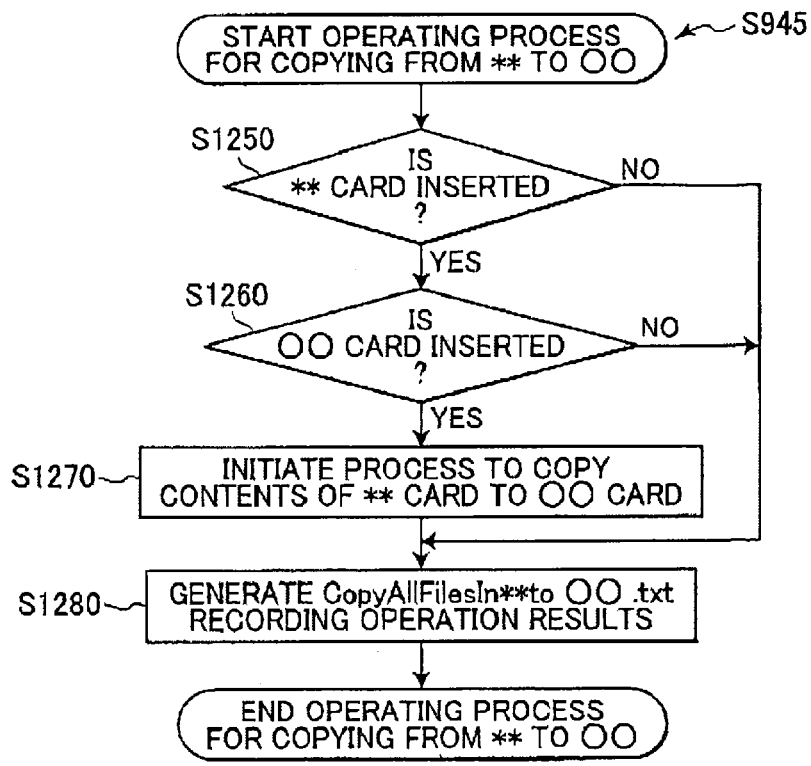
FIG. 18 is a flowchart illustrating steps in an operating process for copying the contents of "**" to "○○" on the printer according to the first embodiment.

FIG. 18 is a flowchart illustrating steps in the operating process to copy files from "" to "○○" in S945 of FIG. 13. In S1250 at the beginning of this operating process the CPU 34 determines whether a memory card serving as the copy source is connected. If the memory card is connected (S1250: YES), in S1260 the CPU 34 determines whether a memory card serving as the copy destination is connected. If the destination memory card is connected (S1260: YES), in S1270 the CPU 34 initiates the operating process to copy the contents of the source memory card to the destination memory card. In S1280 the CPU 34 generates a CopyAllFilesInto○○.txt indicating that the copy operation is underway, and subsequently ends the copy operating process. As described above, the CPU 34 quits the copy operating process after generating the CopyAllFilesIn**to○○.txt without waiting for the operating process to complete, thereby enabling the CPU 34 to return a response to the client for a get command within a short amount of time so that the client does not receive a timeout error.

Examples of operation results written to the file CopyAllFilesInto○○.txt are "An SD card is not inserted. Please select a file after inserting an SD card." when an SD card is not inserted, and "Contents of the  memory card are being copied to the ○○ memory card. Please wait until the access lamp stops blinking and remains lit." when contents are being copied from "**" to "○○".

If the source memory card is not connected (S1250: NO) or if the destination memory card is not connected (S1260: NO), in S1280 the CPU 34 generates the CopyAllFilesIn**to○○.txt file indicating that the copy operation cannot be performed, and subsequently ends the copy process.

Next, the operating process for copying the contents of "" to all memory cards will be described. In the following description, the operating process is performed to copy contents of an SD card substituted for "" to all memory cards.

Figure 19:
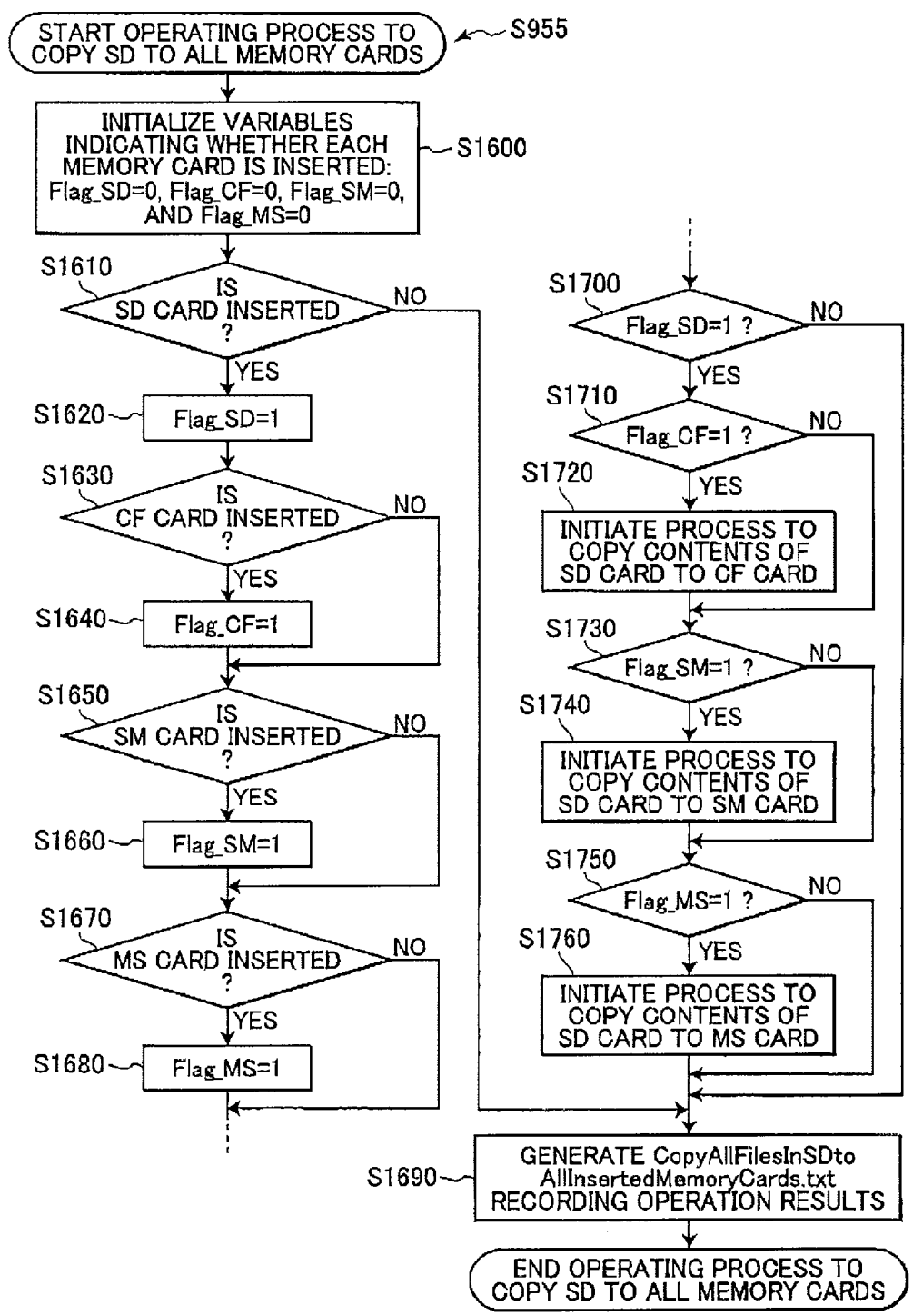
FIG. 19 is a flowchart illustrating steps in a process for copying the contents of an SD card to all memory cards performed on the printer according to the first embodiment.

FIG. 19 is a flowchart illustrating steps in the operating process to copy the contents of an SD card to all memory cards. In S1600 at the beginning of this process, the CPU 34 initializes values of variables indicating whether each memory card is connected.

In S1610 the CPU 34 determines whether the SD card is connected. If the SD card is connected (S1610: YES), then in S1620 the CPU 34 sets a variable Flag_SD to 1, indicating that the SD card is connected. If the SD card is not connected (S1610: NO), in S1690 the CPU 34 generates a CopyAllFilesIn**toAllInsertedMemoryCards.txt file indicating that the copy operation cannot be performed, and subsequently ends the copy operation.

In S1630 the CPU 34 determines whether a CF card is connected. If a CF card is connected (S1630: YES), then in S1640 the CPU 34 sets a variable Flag_CF to 1, indicating that a CF card is connected.

In S1650 the CPU 34 determines whether an SM card is connected. If an SM card is connected (S1650: YES), then in S1660 the CPU 34 sets a variable Flag_SM to 1, indicating that an SM card is connected.

In S1670 the CPU 34 determines whether an MS card is connected. If an MS card is connected (S1670: YES), then in S1680 the CPU 34 sets a variable Flag_MS to 1, indicating that an MS card is connected.

In S1700 the CPU 34 confirms values of the variables indicating whether each of the memory cards is connected. First, the CPU 34 confirms whether the Flag_SD variable is set to 1. If Flag_SD is 1 (S1700: YES), in S1710 the CPU 34 confirms the contents of Flag_CF. If Flag_SD is not 1 (S1700: NO), the CPU 34 ends the process to copy the contents of the SD card to all memory cards.

In S1710 the CPU 34 confirms the value of the variable Flag_CF. If Flag_CF is 1 (S1710: YES), in S1720 the CPU 34 begins copying the contents of the SD card to the CF card. However, if Flag_CF is not 1 (S1710: NO), then the CPU 34 does not copy the contents of the SD card, but in S1730 confirms the value of the variable Flag_SM.

If Flag_SM is 1 (S1730: YES), in S1740 the CPU 34 begins copying the contents of the SD card to the SM card. However, if Flag_SM is not 1 (S1730: NO), then the CPU 34 does not perform this copy operation, but in S1750 confirms the value of the variable Flag_MS.

If Flag_MS is 1 (S1750: YES), then in S1760 the CPU 34 begins copying the contents of the SD card to the MS card. However, if Flag_MS is not 1 (S1750: NO), then the CPU 34 does not perform this copy operation, but advances to S1690.

In S1690 the CPU 34 generates a CopyAllFilesInSDtoAllInsertedMemoryCards.txt file containing the history of operations for copying the above media, and subsequently ends the copy operating process. Here, the CPU 34 generates the CopyAllFilesInSDtoAllInsertedMemoryCards.txt and quits the copy operating process without waiting for the copy operation to be completed, thereby returning a response to the client for a get command within a short time so that the client does not receive a timeout error.

FIG. 19 gives an example of a process for copying the contents of an SD card to all memory cards, but a similar process may be performed for copying the contents of a CF card to other memory cards. Further, an XD card or another card other the SD card, CF card, MS card, and SM card may be used.

An example of operation results written to the file CopyAllFilesInSDtoAllInsertedMemoryCards.txt for a case in which the contents of the "" memory card are copied to "○○" and "▲▲" memory cards (where a character string representing storage media such as the CF, SM, MS, and SD cards is substituted for "", "○○", and "▲▲") is "Copying the contents of the "**" memory card to the "○○" memory card and the "▲▲" memory card. Please wait until the access lamp stops flashing and remains lit."

Figure 20:
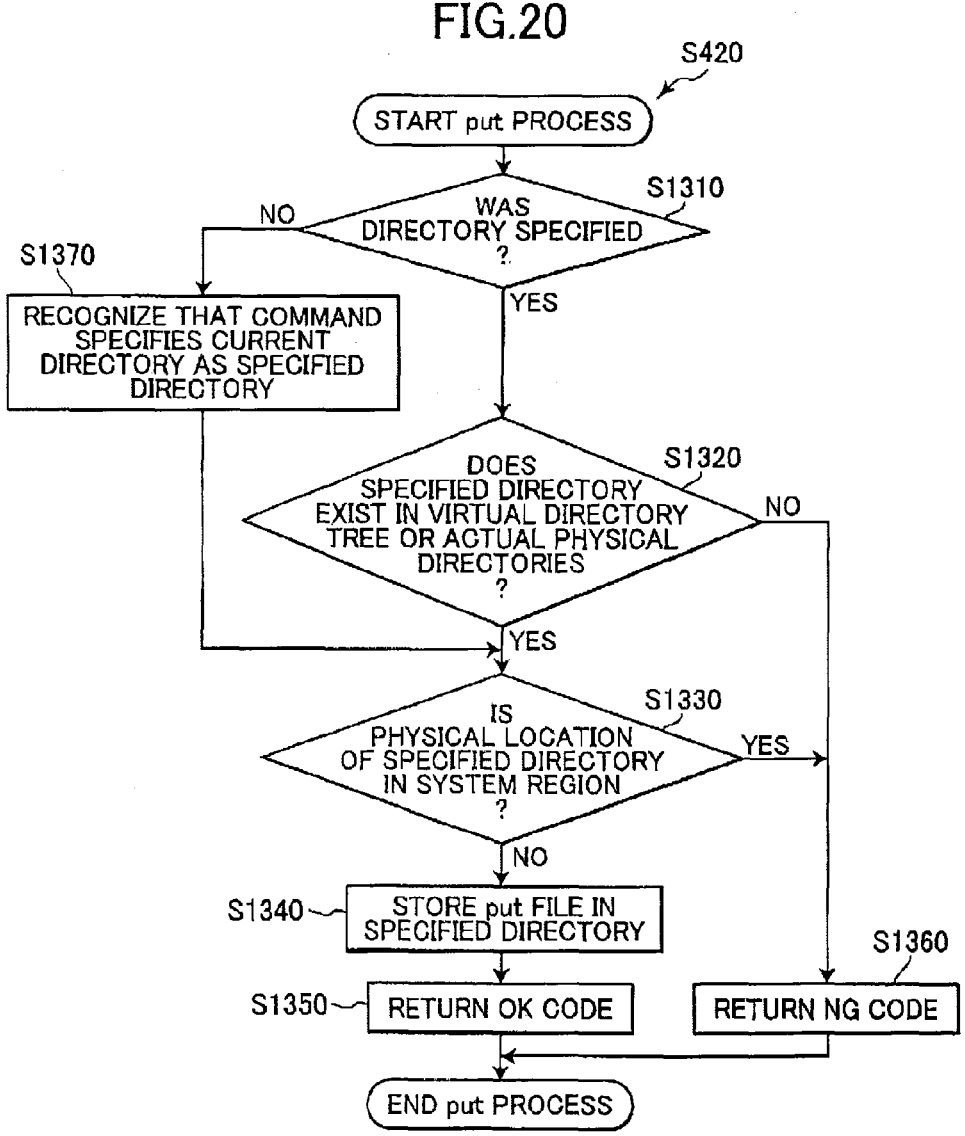
FIG. 20 is a flowchart illustrating steps in a put process performed on the printer according to the first embodiment.
Figure 21:
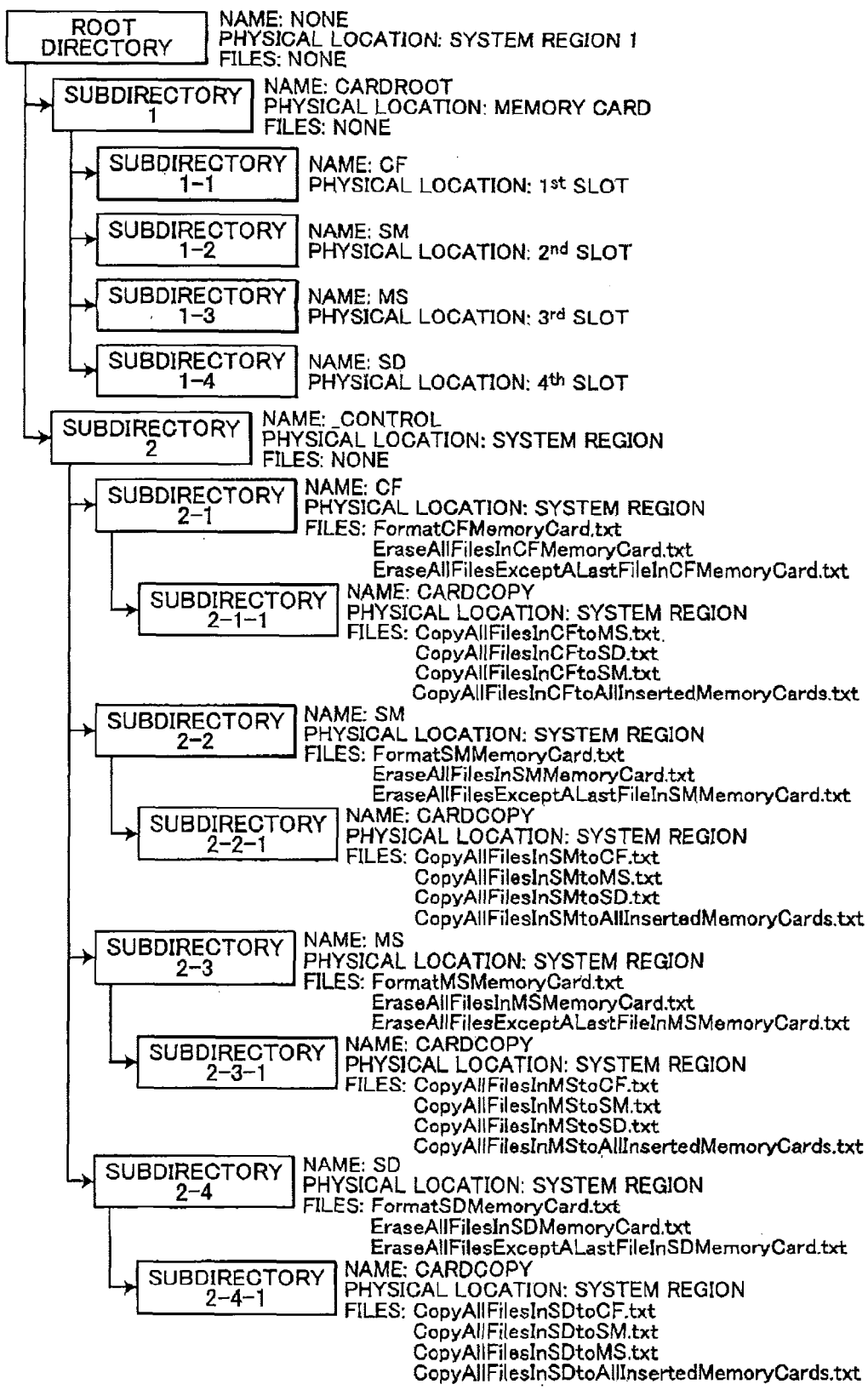
FIG. 21 is an explanatory diagram illustrating a sample virtual directory tree according to the first embodiment.

FIG. 20 is a flowchart illustrating steps in the put process of S420 in FIG. 10. The put process functions to store data for a file transmitted from the client in a put command in a storage device of the FTP server, i.e., to write data for the client-specified file to the FTP server.

In S1310 the CPU 34 determines whether the command specifies a directory (target directory) for storing the file. If the command does specify a target directory (S1310: YES), then in S1320 the CPU 34 determines whether the directory specified in the command exists in the virtual directory tree or in the actual physical directories.

If the specified directory does exist in the virtual directory tree or in the actual physical directories (S1320: YES), in S1330 the CPU 34 determines whether the physical location of the specified directory exists in the system region. If the physical location of the specified directory exists in the system region (virtual directory tree) (S1330: YES), then in S1360 the CPU 34 transmits a failure code to the client indicating that the process failed, and subsequently ends the put process. In other words, it is not possible to access the virtual directory provided for transmitting to the client a filename specifying the status of the printer 80 and the status of storage media connected to the printer 80. This process prevents a situation in which the user of the PC 3 believes to have written data for a file, although the data was not written because the directory is virtual.

However, if the physical location of the specified directory does not exist in the system region, i.e., is in a storage media or other storage device (actual physical directories) (S1330: NO), then in S1340 the CPU 34 stores the data in the specified directory, in S1350 transmits an OK code to the client indicating that the process was successful, and subsequently ends the put process. Hence, the CPU 34 actually stores the data in the storage media or the like.

On the other hand, if the CPU 34 determines in S920 that the specified directory does not exist in the virtual directory tree nor in the actual physical directories (S1320: NO), in S1360 the CPU 34 transmits a failure code to the client indicating that the process failed and subsequently ends the put process.

Further, if the CPU 34 determines in S1310 that the command does not specify a target directory (S1310: NO), then in S1370 the CPU 34 recognizes that the command specifies the current directory as the specified directory, and subsequently continues the process from S1330.

Further, by confirming the status of the printer 80 and the status of storage media connected to the media connectors at this time, the status of storage media can be accurately reflected in the operation-related filenames, even when storage media is disconnected and different storage media is connected. Accordingly, the operation-related filenames correspond to the currently connected memory cards, reducing the chance of a user selecting an incorrect file.

FIG. 22B shows the virtual directory tree after the process for creating virtual directory data has been executed. Filenames assigned to files in the subdirectories are the operation-related filenames.

Figure 23:
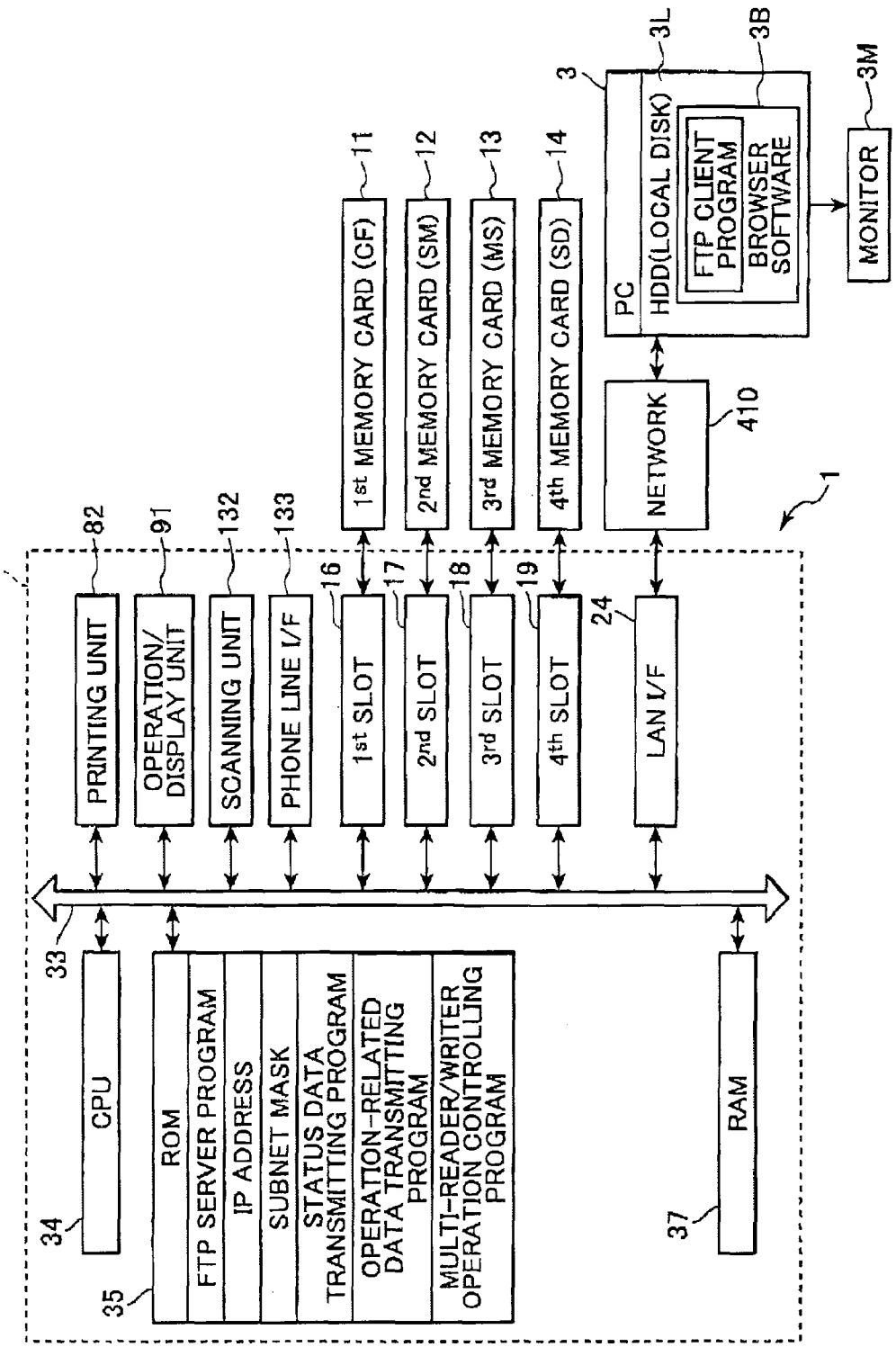
FIG. 23 is a block diagram showing the electrical structure of a printer (card reader) according to a second embodiment of the present invention.

FIG. 23 shows the system region after executing the process for creating virtual file data. As can be seen from FIG. 23, memory for the operation-related files has been allocated in the system region.

FIG. 22 shows the content of the folder CARDCOPY in subdirectory 2-1-1 shown in FIG. 22B. As can be seen from FIG. 22, the folder includes virtual files with operation-related filenames. Virtual files are similarly provided in the other subdirectories and correspond to those subdirectories.

Figure 25:
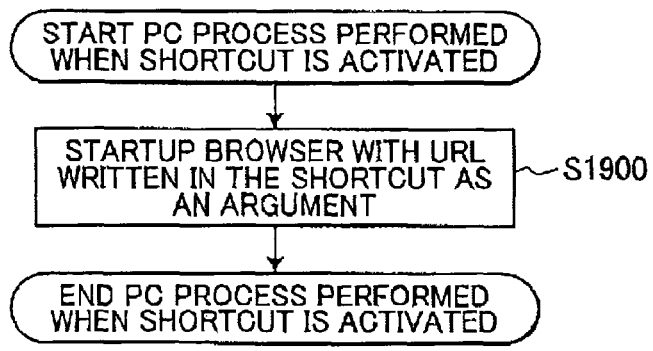
FIG. 25 is a flowchart illustrating steps in a process performed on the PC when activating a shortcut for the printer according to the second embodiment.
Figure 29:
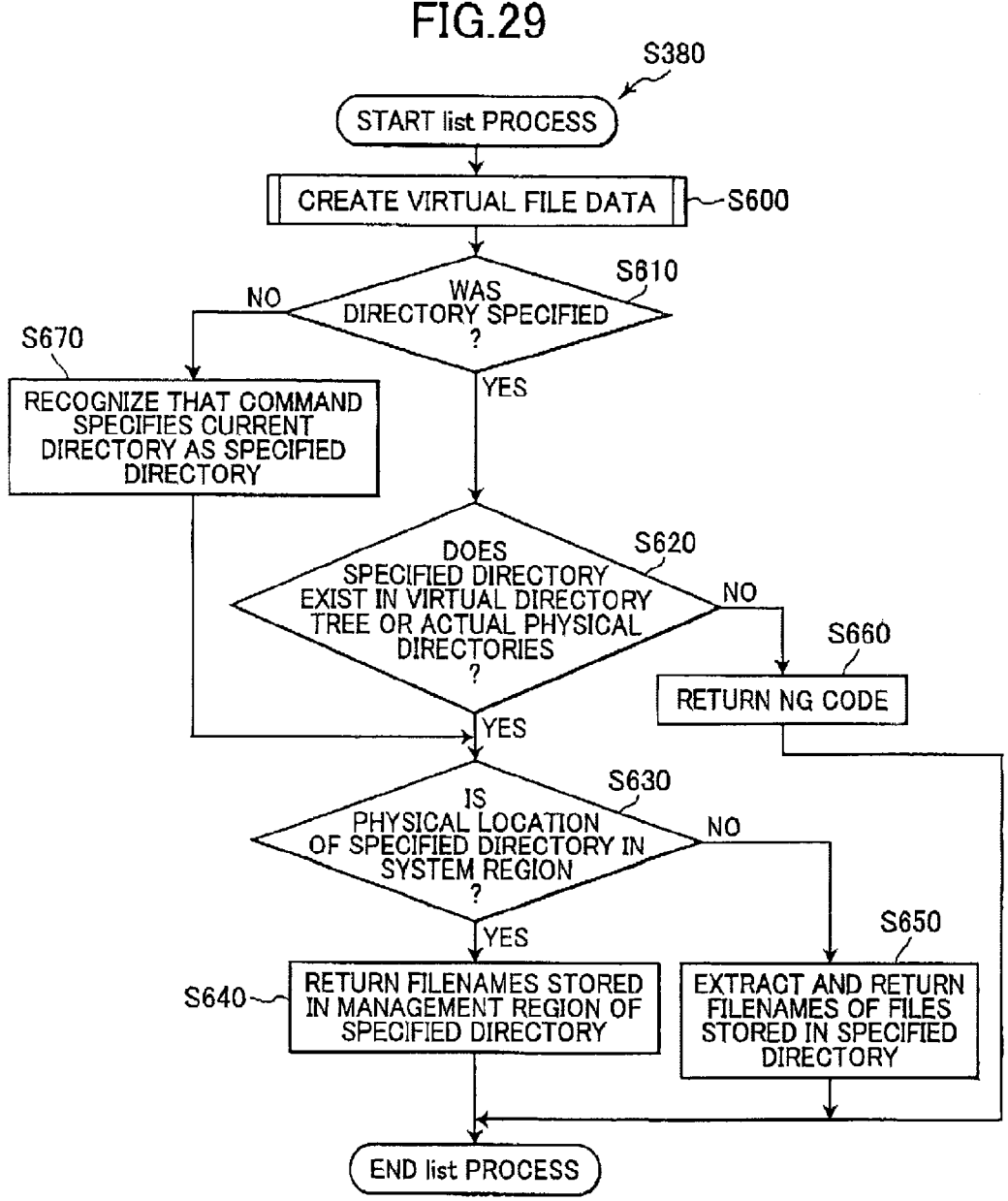
FIG. 29 is a flowchart illustrating steps in a list process performed on the printer according to the first embodiment.
Figure 30:
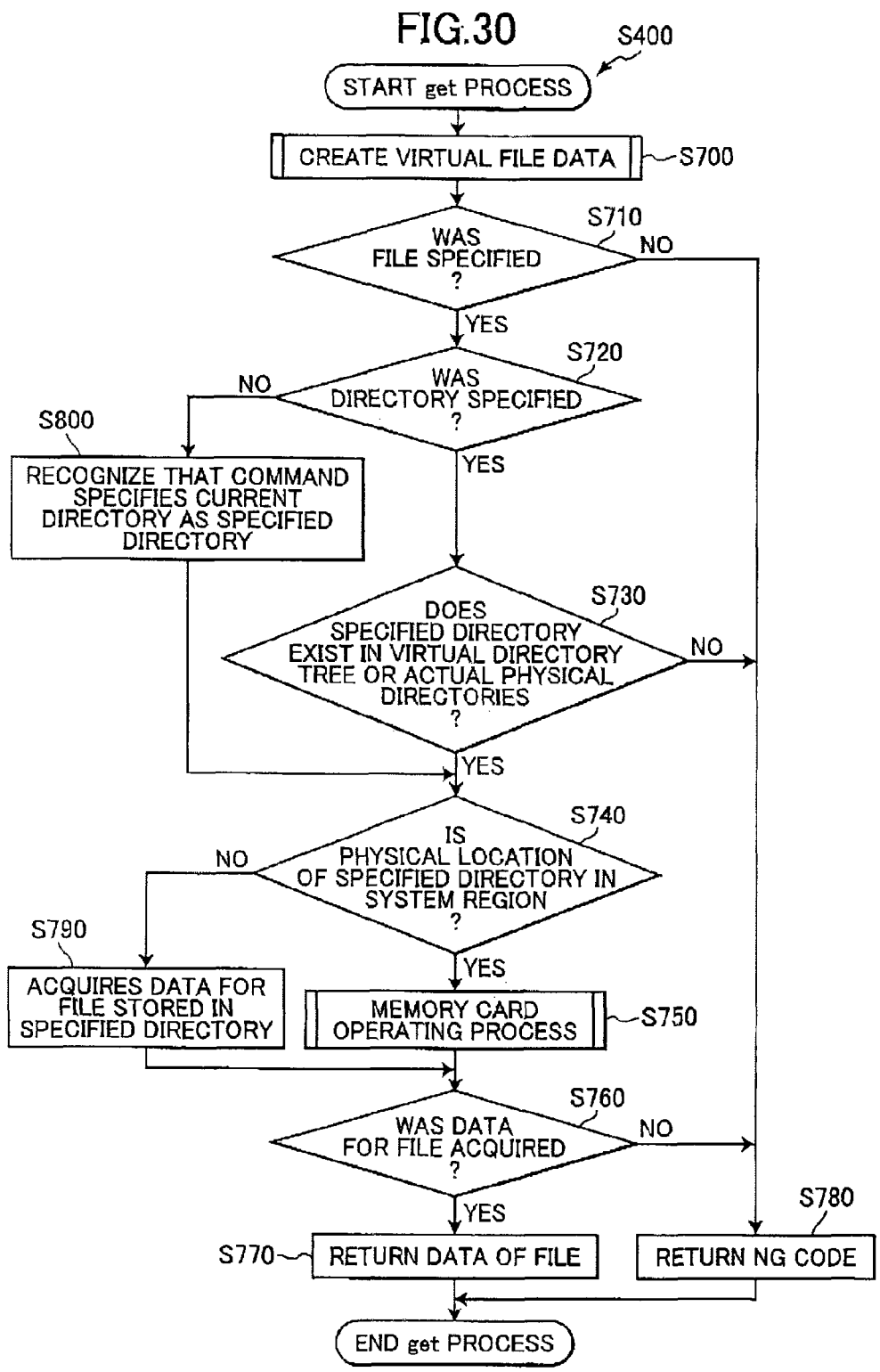
FIG. 30 is a flowchart illustrating steps in a get process performed on the printer according to the first embodiment.
Figure 31:
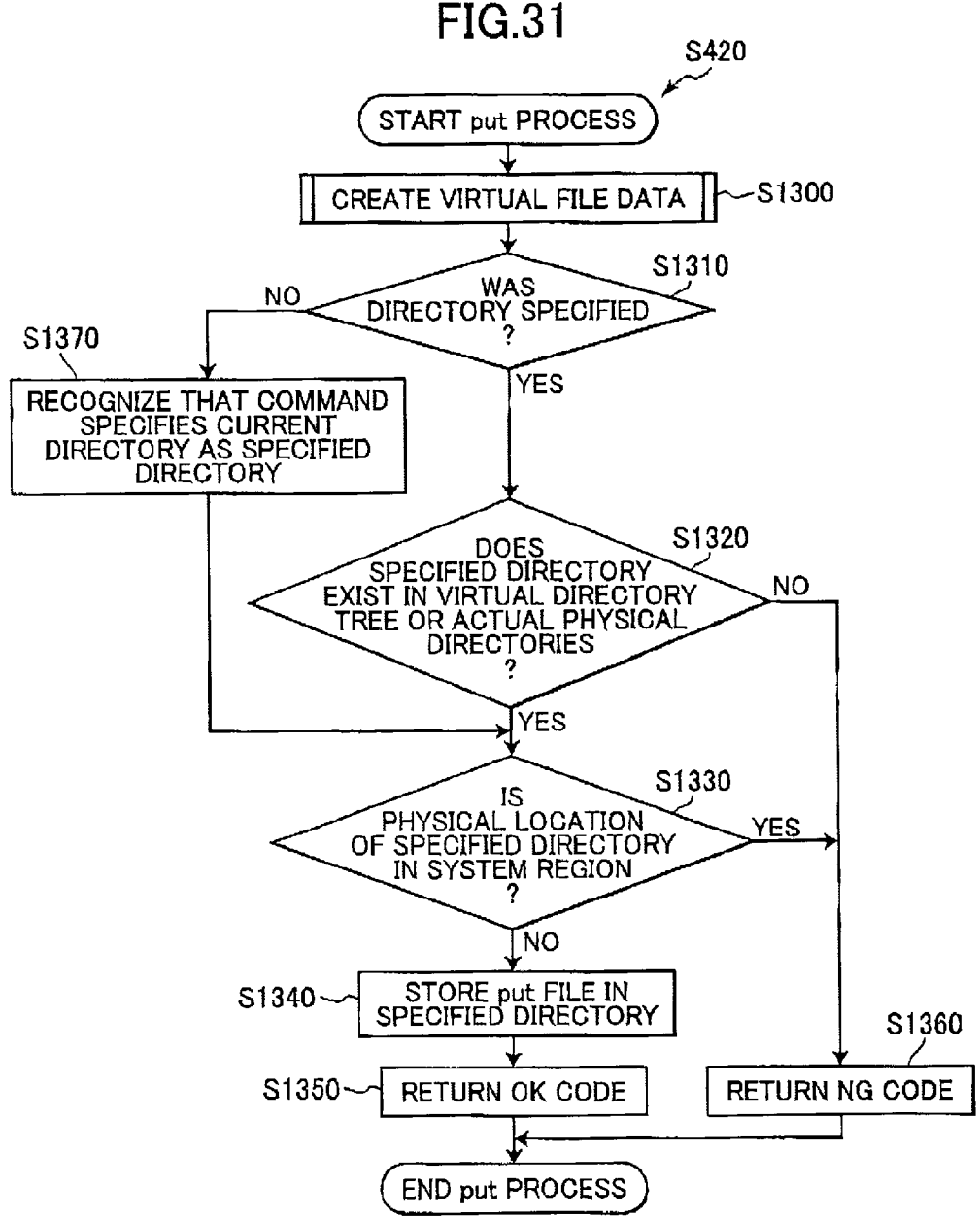
FIG. 31 is a flowchart illustrating steps in a put process performed on the printer according to the first embodiment.

Further, in S1020, S1120, S1220, S1280, and S1690 of FIGS. 14-19 described above, the CPU 34 may also generate a file describing operation results and/or set a filename indicating the operation results. Through this process, the client can learn the operation results by acquiring directory data from the FTP server. FIG. 25 illustrates an example when the CPU 34 attempts to format a CF card when the CF card is not connected.

According to the first embodiment, the FTP client can directly access media itself on the FTP server or can perform media-based operations, without expanding or modifying the FTP protocol. Further, the user can confirm the results of operations performed on media on the FTP server and can obtain the results of operations performed on media on the FTP server, without being bound by restrictions applied to filenames.

Since files having operation-related filenames are stored in the system region separate from the storage media, there is less chance that the user will mistakenly access these files on the FTP server. Since the type of media can be identified, the user can easily perform operations on the desired media. Further, since the type of storage media is identified, the user can easily perform operations on the desired storage media, even when different types of media are used in the same slot, for example.

Next, an FTP system 101 (see FIG. 1) according to a second embodiment of the present invention will be described, wherein like parts and components are designated with the same reference numerals to avoid duplicating description. FIG. 23 is a block diagram showing the electrical structure of a printer 180 according to the second embodiment. In the second embodiment, the ROM 35 stores a status data transmitting program for transmitting the status of the storage media, and an operation-related data transmitting program for transmitting data to a host device. The transmitting data includes operation-related links assigned to storage media-based operations.

Figure 4:
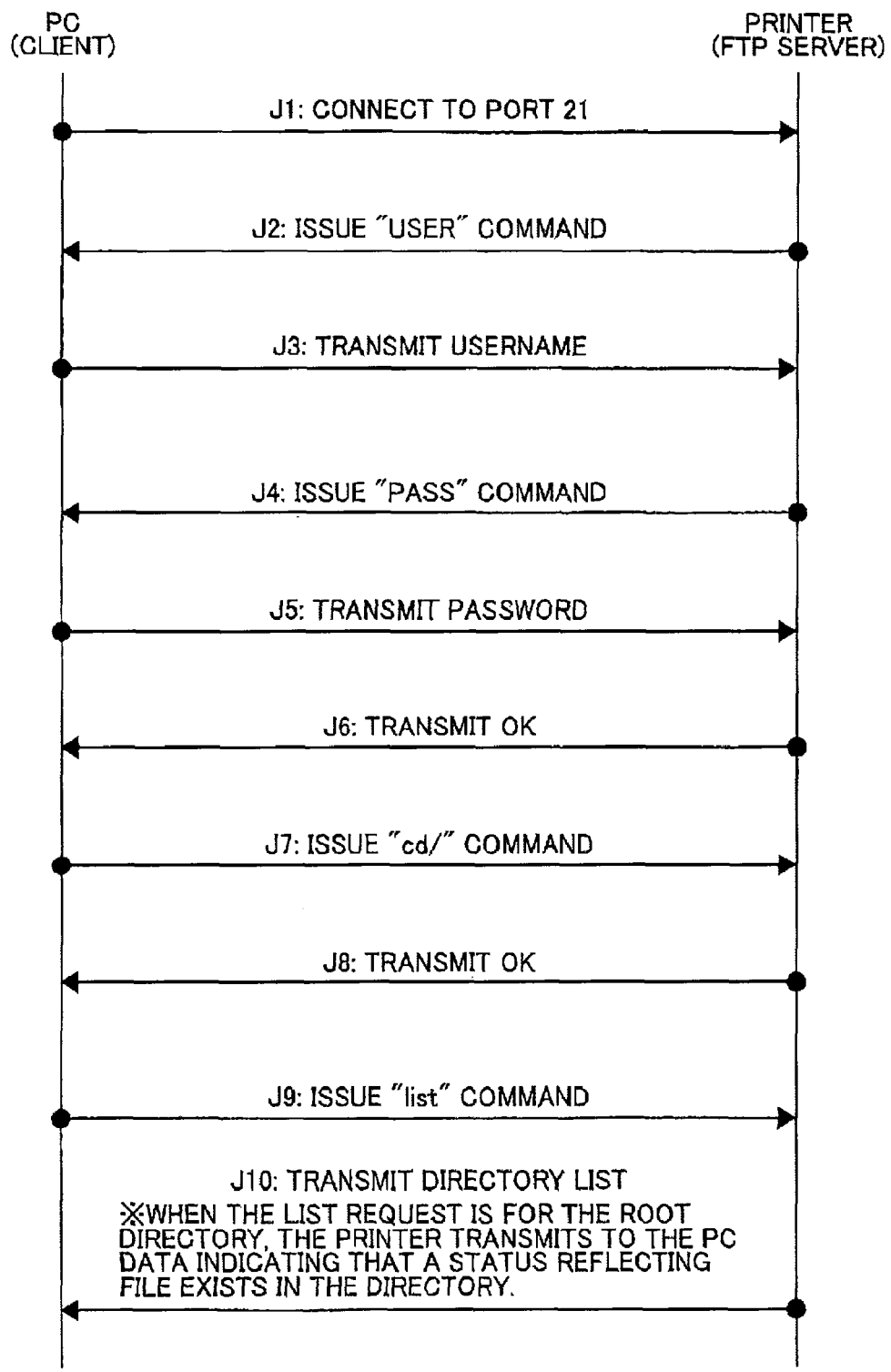
FIG. 4 is an explanatory diagram showing a sequence of operations performed in the FTP system.

The data sequence executed in the second embodiment is identical to that executed with the FTP system 1 according to the first embodiment (see FIG. 4). Next, the process of the present invention will be described with reference to flowcharts and the like.

Figure 24:
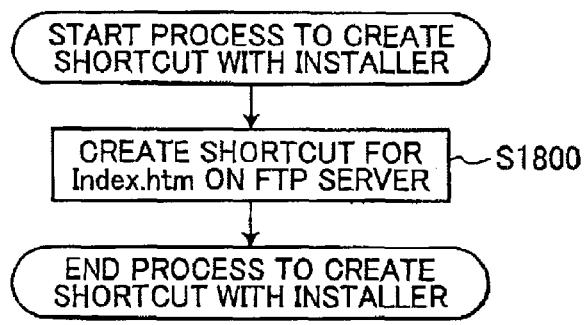
FIG. 24 is a flowchart illustrating steps in a process to create a shortcut performed with an installer on the printer according to the second embodiment.

FIG. 24 is a flowchart illustrating steps in a process for creating a shortcut according to an installer program. As with programs for installing printer drivers or other software in the PC 3, the installer for the printer 180 creates a shortcut to Index.htm on the FTP server in S1800 of FIG. 24. This shortcut can reduce the burden on the user for inputting an IP address, password, and the like required for connecting to the FTP server each time the user wishes to connect.

FIG. 25 is a flowchart illustrating steps in a process performed on the PC 3 when the shortcut is activated. A URL for Index.htm or the like on the FTP server is written in the shortcut. The PC 3 assigns the URL written in the shortcut as an argument when starting the browser in order to connect to the FTP server provided in the printer 180.

The FTP server process performed in the second embodiment is also identical to that of FIG. 7 in the first embodiment, except in the process for initializing the virtual directory tree. This process will be described next with reference to FIG. 26.

In S1910 of FIG. 26, the CPU 34 allocates in the RAM 37 or the like an amount of memory required for managing the structure of the virtual directory tree, and an amount of memory required for managing the FTP server system.

In S1920 the CPU 34 allocates a region for managing the root directory of the FTP server in the virtual directory tree formed in memory.

In S1930 the CPU 34 initializes the allocated region for managing the root directory. Specifically, the CPU 34 sets attributes for the management region indicating that there is no directory name, that the physical location of the directory is in a system region described later, that there are no filenames for files stored in the directory (i.e., the directory contains no files), and that there are no subdirectories. The system region is a region of memory (the RAM 37) allocated in the process for initializing the virtual directory tree.

In S1940 the CPU 34 confirms that the root directory is set as the current directory. By making this recognition, the printer 80 can return filenames for files and subdirectory names for subdirectories within the root directory, which is the current directory, when an FTP client (hereinafter simply referred to as "client") accessing the FTP server transmits a list command without specifying "cd/".

FIG. 27A conceptually illustrates a virtual directory tree configured by the process for initializing the virtual directory tree.

Figure 32A:
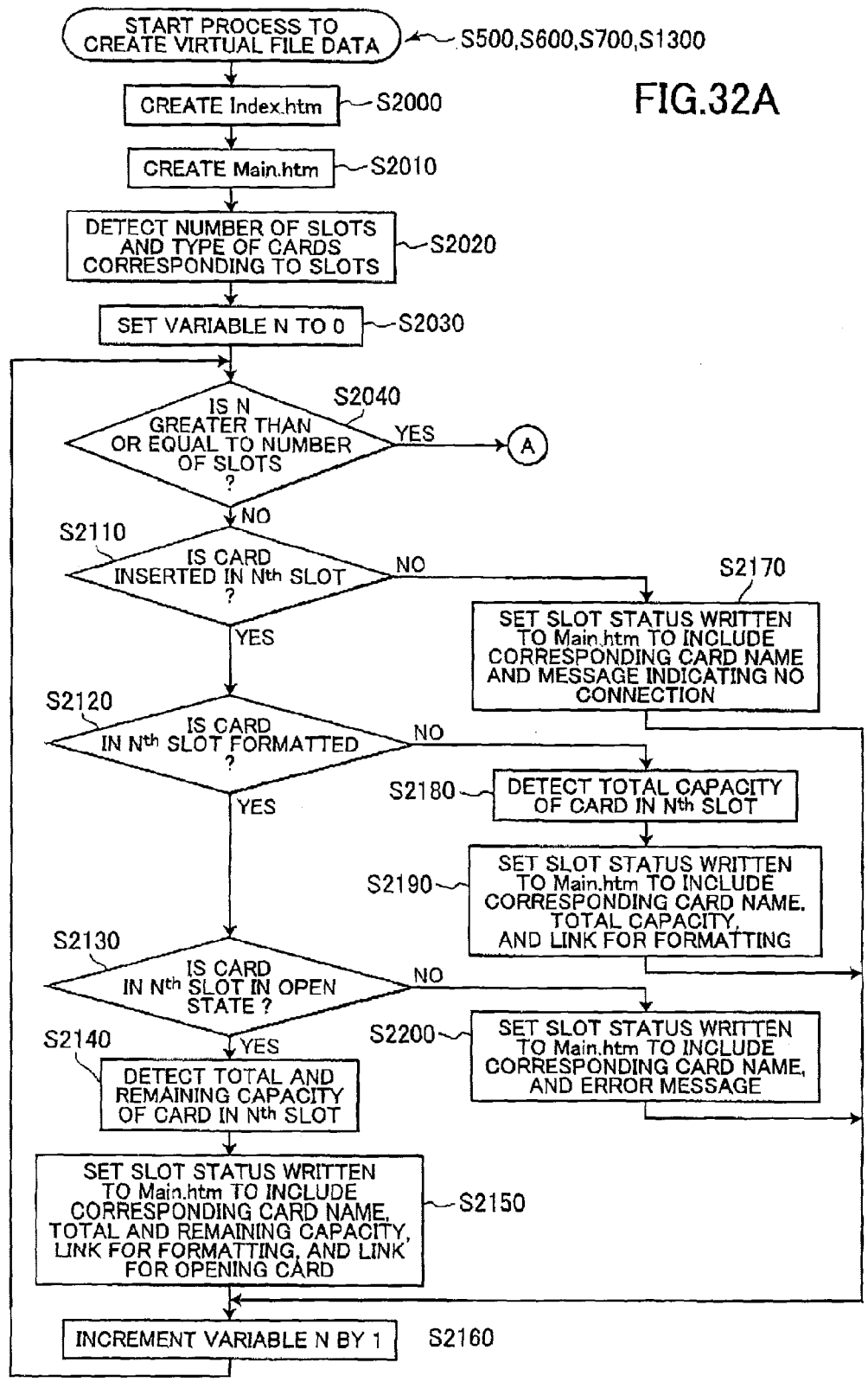
FIGS. 32A and 32B are flowcharts illustrating steps in a process to create virtual file data in the printer according to the second embodiment.
Figure 32B:
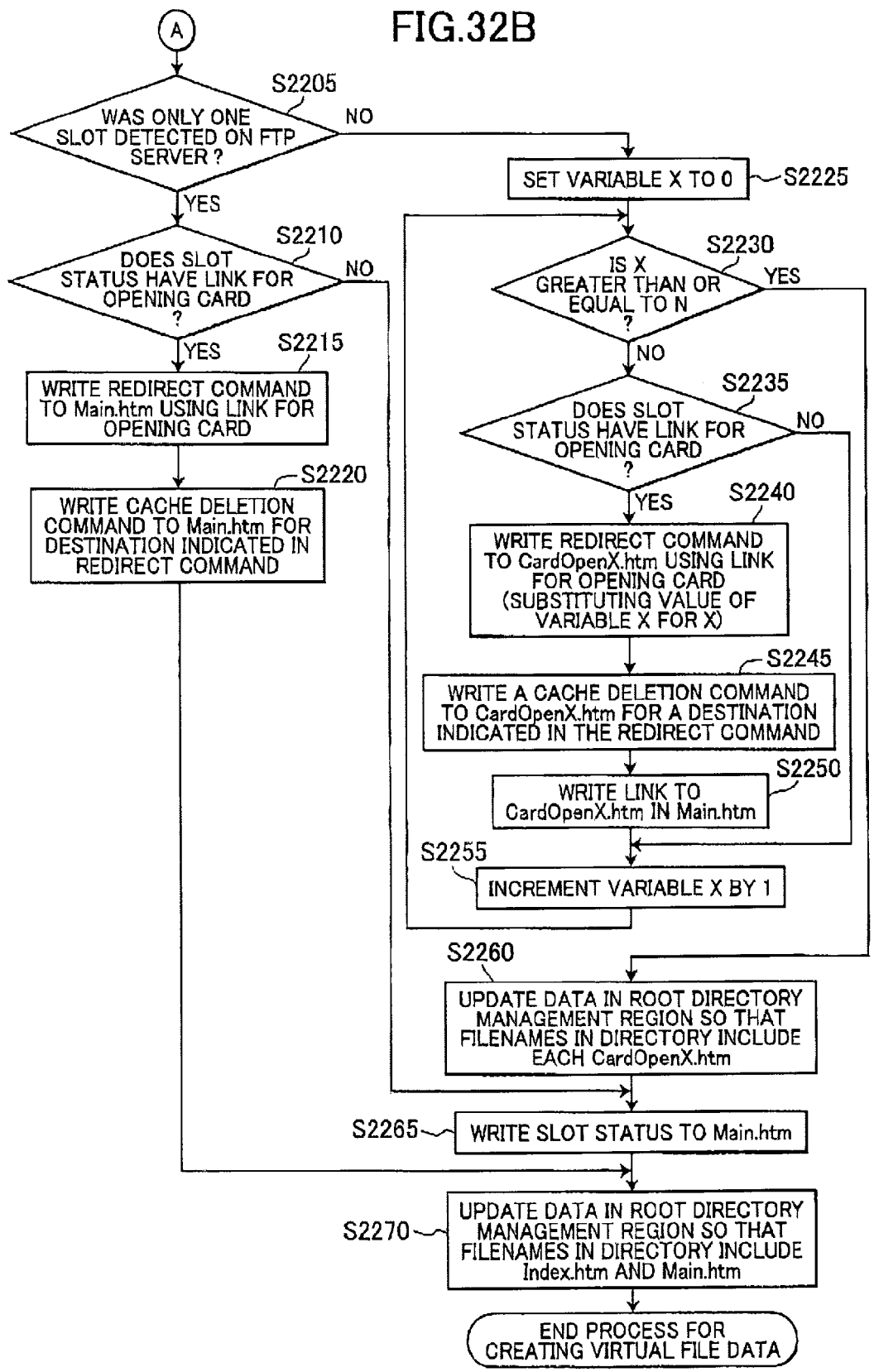

In the second embodiment, the normal operation process is identical to that in the first embodiment. Further, the cd, list, get, and put processes are similarly executed except for executing a process for creating virtual file data in S500, S600, S700, and S1300 before S510, S610, S710, and S1310, respectively, as shown in FIGS. 28 through 31. Next, the process for creating virtual file data in S500, S600, S700, and S1300 will be described next with reference to FIGS. 32A and 32B. FIGS. 32A and 32B are flowcharts illustrating steps in the process for creating virtual file data according to the second embodiment.

The process for creating virtual file data in the second embodiment functions to create the Index.htm file and to set the content of a Main.htm file. The Index.htm file and the Main.htm file are viewed by the FTP client. In other words, the process serves to set the data content for notifying the FTP client of the status on the FTP server and to set operations that the FTP client can perform on connected storage media.

Further, by confirming the status of the printer 180 and the status of storage media connected to the media connectors at this time, the status of storage media can be accurately reflected in the operation-related filenames, even when storage media is disconnected and different storage media is connected. Accordingly, the operation-related filenames correspond to the currently connected memory cards, reducing the chance of a user selecting an incorrect operation.

Returning to the description of the process, the CPU 34 initially creates the files Index.htm in S2000 and Main.htm in S2010.

Index.htm holds a redirect command for transferring to ftp://brn_600789/Main.htm. Accordingly, by accessing Index.htm, the user can be redirected to Main.htm.

Figure 33:
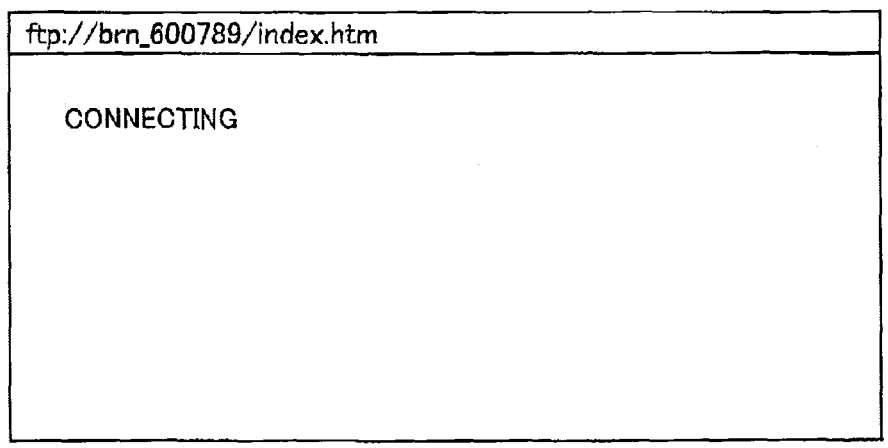
FIG. 33 is a screenshot showing an Index.htm file generated according to the second embodiment.

Index.htm also includes a command for deleting cache data for ftp://brn_600789/Main.htm. Some browsers save HTML files as cache when the files are accessed. Since the previously accessed HTML files remain in cache, these browsers sometimes display the cached file rather than the updated HTML file. In order to display the updated HTML, it is necessary to delete the cache data using a cache deletion command. FIG. 33 shows a sample display of a generated Index.htm file.

When the Index.htm file is generated, Main.htm has no content. The FTP server automatically writes content to Main.htm according to the following process.

In S2020 of FIG. 32A, the CPU 34 checks the status of the printer 180. At this time, the CPU 34 also acquires data related to the number of media connectors in the printer 180 and the type of storage media that can be connected to these media connectors.

In S2030 the CPU 34 sets a variable N to 0. This variable N is used in the program when confirming data for all media connectors.

In S2040 the CPU 34 compares N to the number of media connectors. If N is smaller than the number of media connectors (S2040: NO), then in S2110 the CPU 34 determines whether storage media is connected to the $N^{th}$ media connector (hereinafter also referred to as the $N^{th}$ slot).

If storage media is connected to the $N^{th}$ slot (S2110: YES), in S2120 the CPU 34 determines whether the storage media has been formatted.

If the storage media in the $N^{th}$ slot has been formatted (S2120: YES), in S2130 the CPU 34 determines whether the storage media connected to the $N^{th}$ slot is open.

If the storage media connected to the $N^{th}$ slot is in an open state (S2130: YES), in S2140 the CPU 34 checks the total and remaining storage capacity of the storage media connected to the $N^{th}$ slot. In S2150 the CPU 34 sets the status of the slot for writing to Main.htm. The writing status includes the corresponding card name, the total storage capacity and remaining storage capacity, a link for initiating the formatting process, and a link for opening the card. Subsequently, in S2160 the CPU 34 increments the variable N by 1.

Next, the CPU 34 returns to S1040 and repeats the series of processes in S2040-S2160 until all media connectors in the printer 180 have been confirmed (S2040: YES).

On the other hand, if storage media is not connected to the $N^{th}$ slot (S2110: NO), then in S2170 the CPU 34 sets the status of the slot for writing to Main.htm. The writing status includes the corresponding card name, a message indicating that a storage media is not connected. Subsequently, the CPU 34 advances to S2160.

If the storage media in the $N^{th}$ slot has not been formatted (S2120: NO), then in S3180 the CPU 34 detects the total storage capacity of the storage media connected to the $N^{th}$ slot. In S2190 the CPU 34 sets the status of the slot for writing to Main. The writing status includes the corresponding card name, the total storage capacity, and a link for initiating the formatting process. Subsequently, the CPU 34 advances to S2160.

Further, the storage media connected to the $N^{th}$ slot is not in an open state (S2130: NO), then in S2200 the CPU 34 sets the status of the slot for writing to Main. The writing status includes the corresponding card name and an error massage indicating that the storage media is connected to the $N^{th}$ slot, but is not in an open state.

After confirming all media connectors in the printer 180 (S2040; YES), the CPU 34 exits the loop in order to confirm the status of all media connectors.

Specifically, after exiting the loop, in S2205 of FIG. 32B the CPU 34 confirms the number of slots. If there is only one slot (S2205: YES), in S2210 the CPU 34 determines whether there is a link in the slot status for opening the card.

Figure 34A:
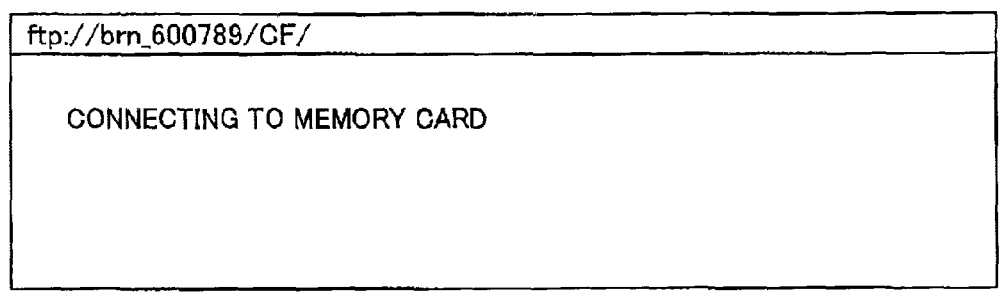
FIGS. 34A and 34B are screenshots showing a Main.htm file when the slot status has a link for opening the card.
Figure 34B:
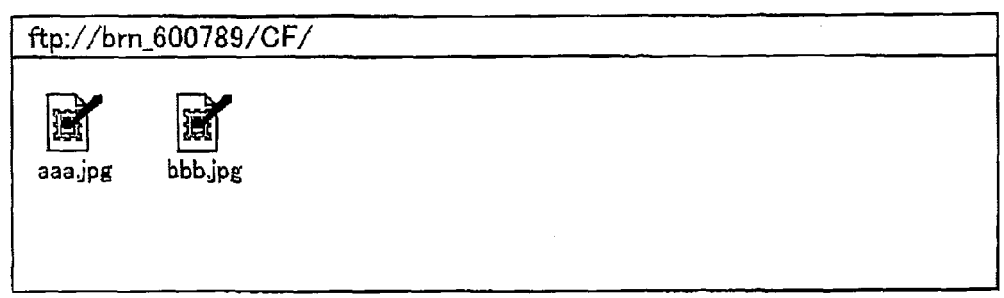
Figure 34C:
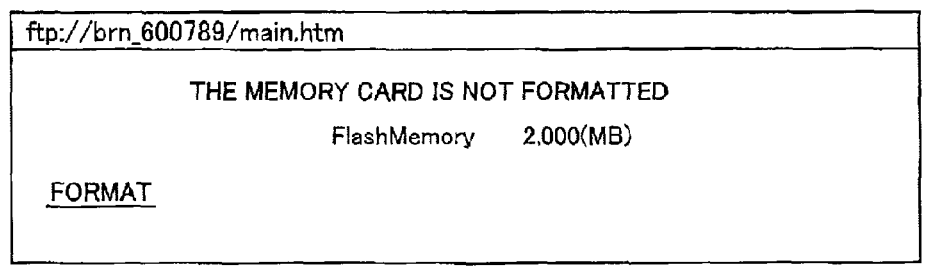
FIGS. 34C and 34D are screenshots showing the Main.htm file when the slot status does not have a link for opening the card.

If there is a link in the slot status for opening the card (S2210: YES), in S2215 the CPU 34 writes a command for redirecting to Main.htm using the link for opening the card. FIGS. 34A and 34B show sample screenshots when the client clicks the link for opening the card in Main.htm. FIG. 34A shows an example of when executing the redirect command written to Main.htm, and FIG. 34B shows the state of the browser after opening the card according to the redirect command written to Main.htm.

In S2220 the CPU 34 writes a command to Main.htm for deleting the cache data for the redirect destination indicated in the redirect command.

In S2270 the CPU 34 updates the data in the region for managing the root directory. More specifically, the CPU 34 adds the created Index.htm and Main.htm to the root directory.

After updating the data in the management region, the CPU 34 ends the process for creating virtual file data.

Figure 34D:
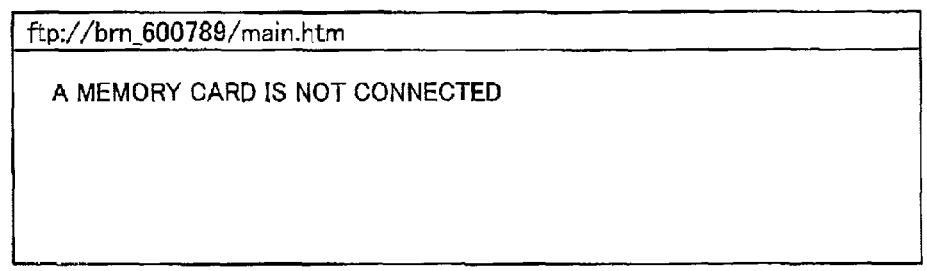

If a link for opening the card does not exist in the slot status (S2210: NO), in S2265 the CPU 34 writes the status of the slot to Main.htm, in S2270 updates the data for the management region of the root directory, and ends the process for creating virtual file data. If the slot status does not include a link for opening the card, then it is possible that the memory card is not formatted or not connected. FIGS. 34D and 34D show sample screenshots when the client accesses to Main.htm for this situation.

On the other hand, if the CPU 34 recognizes a plurality of slots (S2205: NO), in S2225 the CPU 34 sets a variable X to 0.

In S2230 the CPU 34 compares the variable X to the variable N. If X is smaller than N (S2230: NO), in S2235 the CPU 34 determines whether the slot status includes a link for opening the card.

If the slot status contains a link for opening the card (S2235: YES), then in S2240 the CPU 34 writes a command for redirecting to CardOpenX.htm using the link for opening the card (where X is replaced with the value of the variable X).

In S2245 the CPU 34 writes a command to CardOpenX.htm for deleting cache data for the destination indicated in the redirect command. In S2250 the CPU 34 writes a link to CardOpenX.htm in Main.htm. Subsequently, in S2255 the CPU 34 increments the variable N by 1. Next, the CPU 34 returns to S2230 and repeats the series of processes in S2230-S2255 until all media connectors in the printer 180 have been confirmed (S2230: YES). After confirming all media connectors in the printer 180 (S2230: YES), the CPU 34 exits the loop in order to update data in the root directory management region. Specifically, after exiting the loop, in S2260 the CPU 34 adds each OpenCardX.htm to the root directory.

Figure 34E:
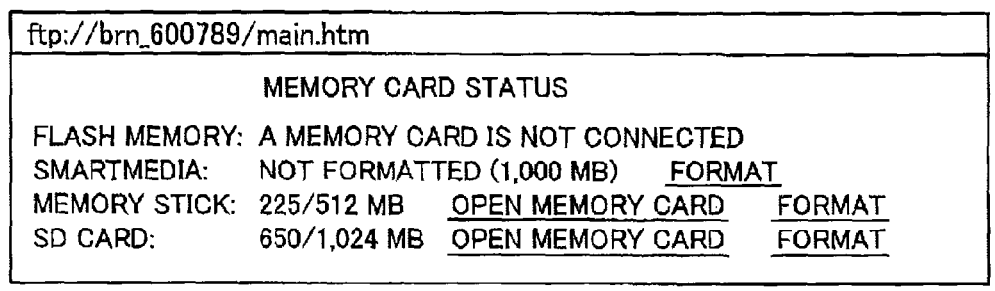
FIGS. 34E through 34G are screenshots showing the Main.htm file when a plurality of slots have been recognized in the FTP system.
Figure 34F:
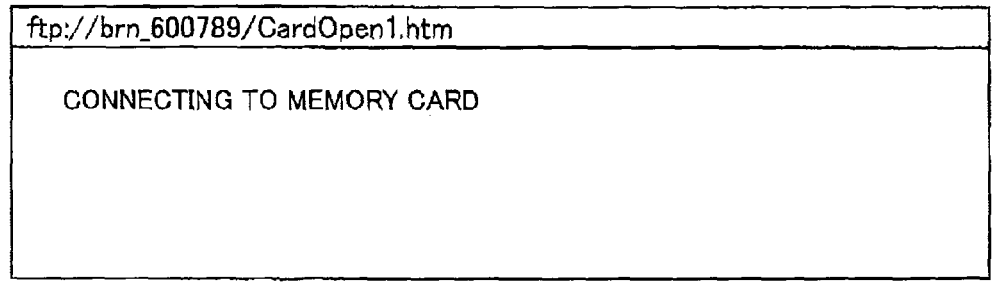
Figure 34G:
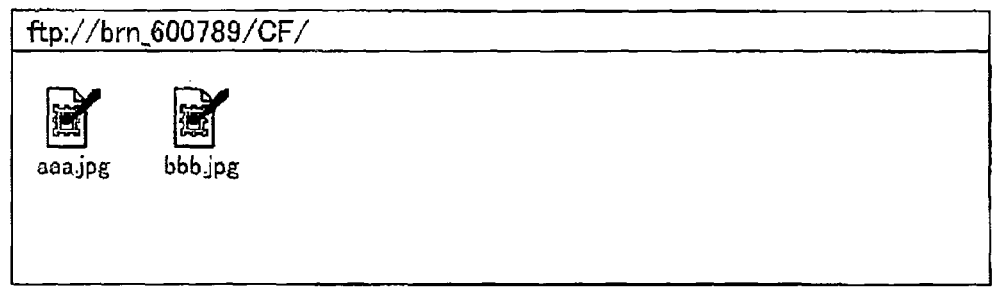

In S2265 the CPU 34 writes the slot status to Main.htm, in S2270 updates data in the region for managing the root directory, and ends the process for creating virtual file data. FIGS. 34E through 34G show sample screenshots displayed when a plurality of slots have been recognized. If a user clicks on "Open memory card" in the browser shown in FIG. 34E, the browser temporarily displays a page in which the redirect command for accessing the card is written (see FIG. 34F) and subsequently displays the content of the card (see FIG. 34G).

FIG. 27B conceptually illustrates the virtual directory tree resulting from executing the process to create virtual file data. In this example, the root directory includes the files Index.htm and Main.htm, and each media connector is treated as a directory.

Figure 35A:
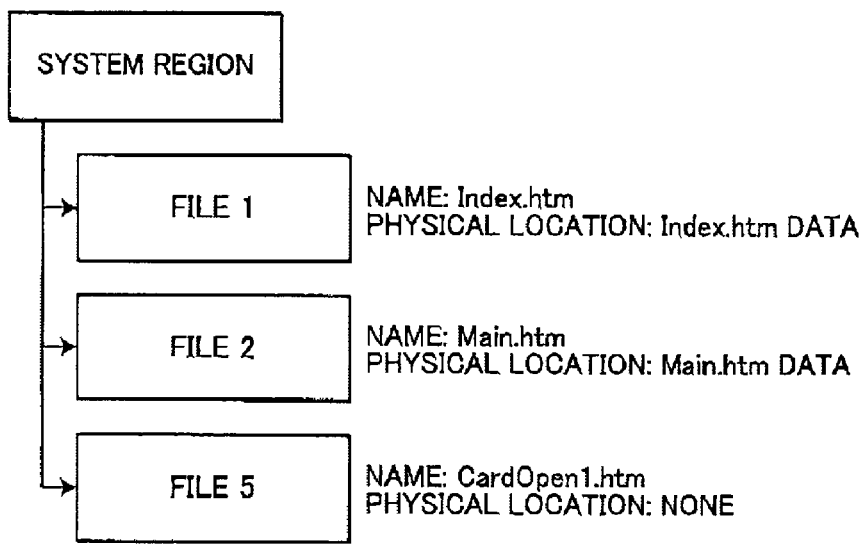
FIGS. 35A and 35B are explanatory diagrams showing the system region of the FTP system according to the second embodiment.

FIG. 35A conceptually illustrates the system region resulting from executing the process for creating virtual file data. In this example, the system region includes the files Index.htm, Main.htm, and CardOpen1.htm.

Figure 36:
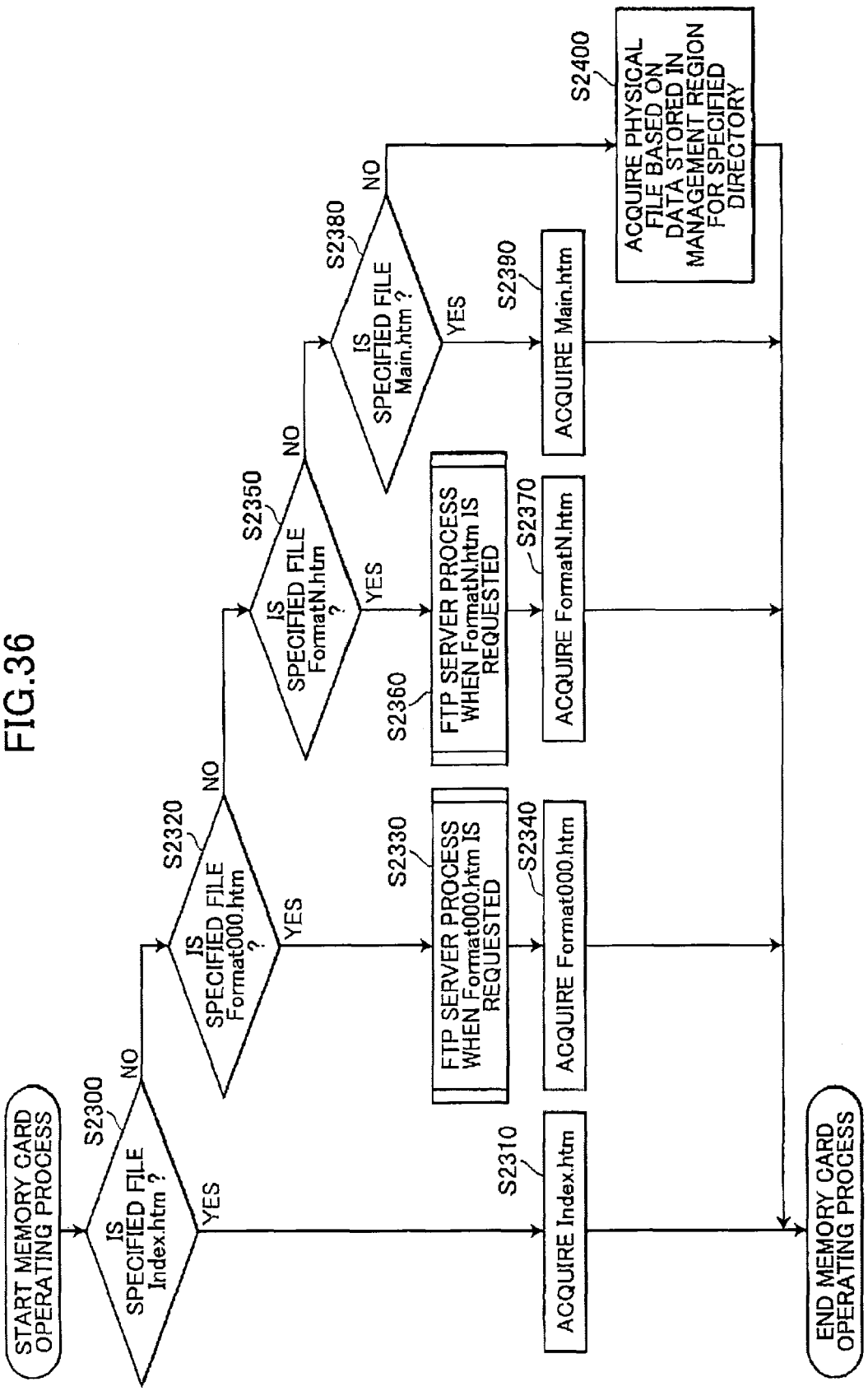
FIG. 36 is a flowchart illustrating steps in a memory card operating process performed on the printer according to the second embodiment.

FIG. 36 is a flowchart illustrating steps in a memory card operating process according to the second embodiment (corresponding to the process in FIGS. 12 and 13 of the first embodiment). The memory card operating process functions to perform an operation on a memory card, such as formatting or deleting files, based on a specified file.

If the specified file is Index.htm (S2300: YES), then in S2310 the CPU 34 acquires the Index.htm file and subsequently ends the memory card operating process. Regardless of whether the file acquired is Index.htm, the physical file acquired in the memory card operating process is transmitted to the client in S770 (FIG. 12). Since Index.htm including Main.htm, another get process is started automatically. Thus, the user access Main.htm via Index.htm.

Figure 37:
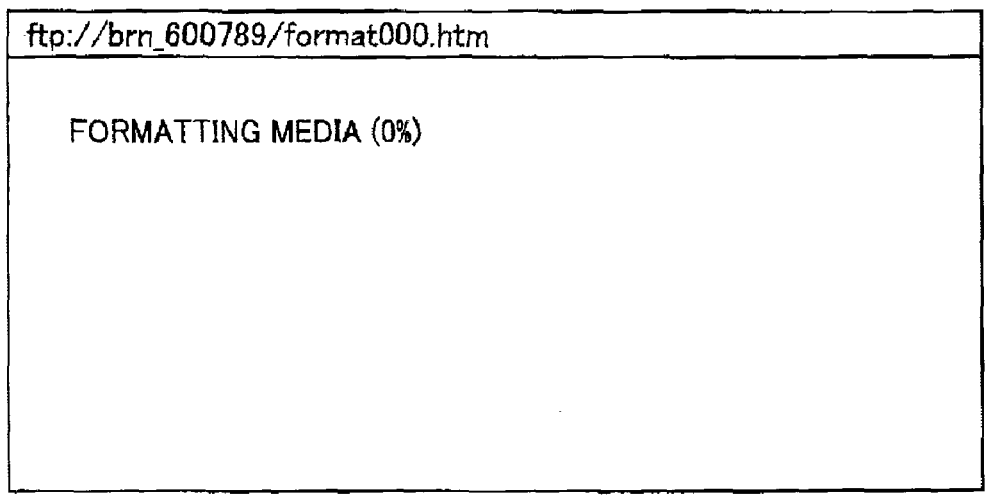
FIG. 37 is a screenshot of Format000.htm on the printer according to the second embodiment.

When the specified file is Format000.htm (S2320: YES), in S2330 the CPU 34 executes an FTP server process for cases in which Format000.htm is requested, in S2340 acquires the Format000.htm file and subsequently ends the memory card operating process. For example, if the user clicks "FORMAT" in FIG. 34E, it corresponds to specify Format000.htm by the user. FIG. 37 shows an example display of the Format000.htm file.

If the specified file is FormatN.htm (where N is replaced by the value of a variable N different from the variable N used in the process for creating virtual file data; S2350: YES), in S2360 the CPU 34 executes an FTP server process for cases when the FormatN.htm file is requested, in S2370 acquires the FormatN.htm file, and subsequently ends the memory card operating process.

If the specified file is Main.htm (S2380: YES), in S2390 the CPU 34 acquires the Main.htm file, and subsequently ends the memory card operating process.

If the specified file does not match any of the above files Index.htm, Format000.htm, FormatN.htm, or Main.htm (S2380: NO), in S2400 the CPU 34 acquires a physical file based on data stored in the region for managing the specified directory, and subsequently ends the memory card operating process.

Figure 38:
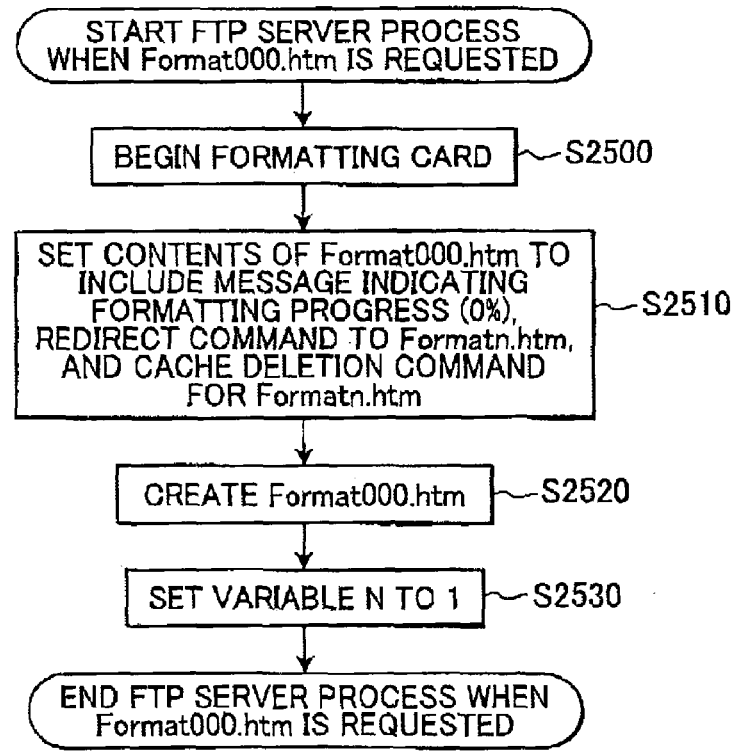
FIG. 38 is a flowchart illustrating steps in an FTP server process performed on the printer when Format000.htm has been requested.

FIG. 38 is a flowchart illustrating steps in the FTP server process performed when Format000.htm is executed in S2330 when Format000.htm ("FORMAT" in FIG. 34E) was requested. In S2500 of FIG. 38 the CPU 34 begins formatting the memory card.

In S2510 the CPU 34 sets contents of Format000.htm. Specifically, the CPU 34 sets the content to include a message indicating the progress of the formatting operation (0%), a redirect command for transferring to FormatN.htm, and a cache deletion command for updating FormatN.htm.

In S2520 the CPU 34 creates Format000.htm in the root directory, in S2530 sets a variable N indicating the degree of progress in formatting to 1, and subsequently ends the FTP server process.

Then Format000.htm created in S2520 is transferred to the client in S770 of FIG. 10. Since Format000.htm including the redirect command for transferring to FormatN.htm, another get process is started automatically and in S750 of FIG. 12 the memory card operating process is executed. Thus, in S2360 of FIG. 36 the FTP server process for cases when the FormatN.htm file is requested, is executed.

Figure 39:
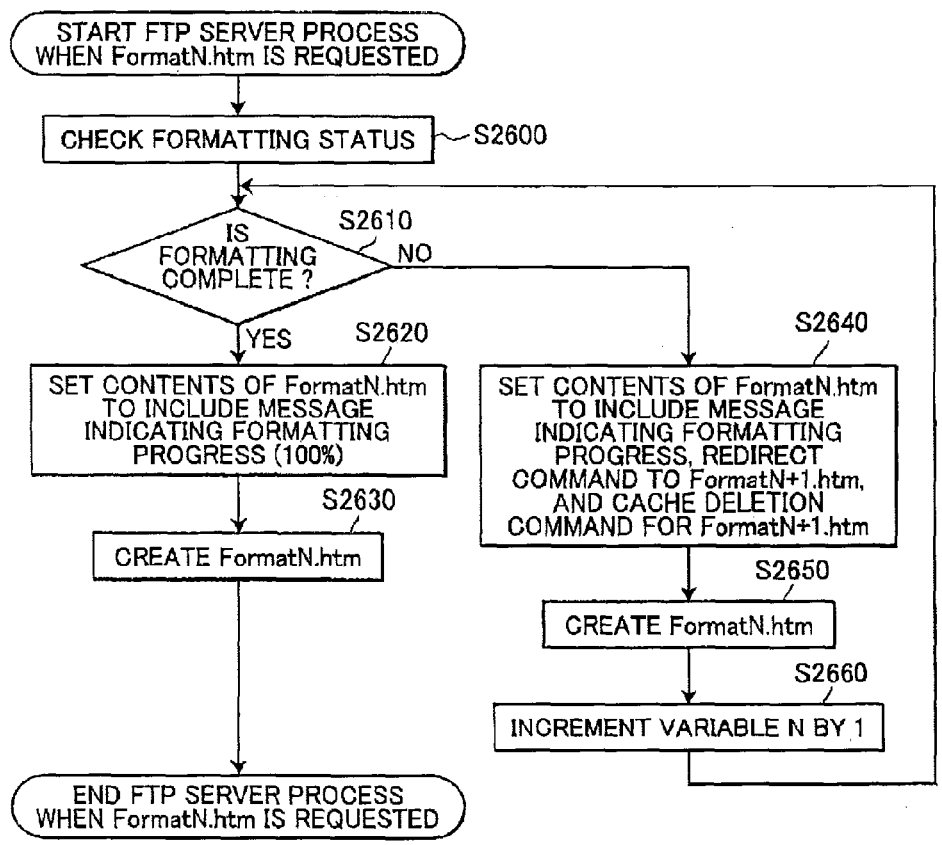
FIG. 39 is a flowchart illustrating steps in an FTP server process performed on the printer when FormatN.htm has been requested.

FIG. 39 is a flowchart illustrating steps in the FTP server process performed in S2360 of FIG. 36 when the FormatN.htm file was requested. In this process, N is a variable set in S2530 and changes as formatting progresses. In S2600 of FIG. 39, the CPU 34 checks the status of the formatting process.

If the CPU 34 determines that the memory card is formatted or that formatting is completed (S2610: YES), in S2620 the CPU 34 sets contents of the file FormatN.htm. Specifically, the CPU 34 sets FormatN.htm to include a message indicating the progress of formatting (100%). In S2630 the CPU 34 creates the file FormatN.htm and subsequently ends the FTP server process.

Figure 40A:
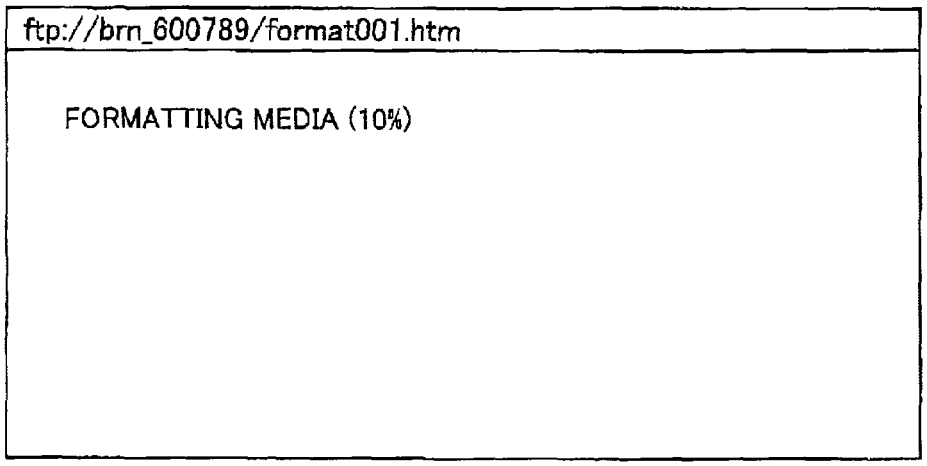
FIGS. 40A through 40C are screenshots showing FormatN.htm on the printer according to the second embodiment.
Figure 40B:
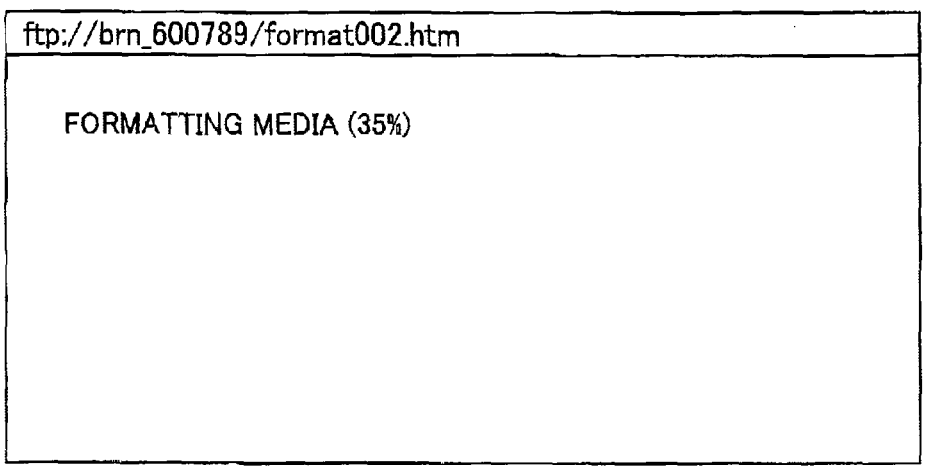
Figure 40C:
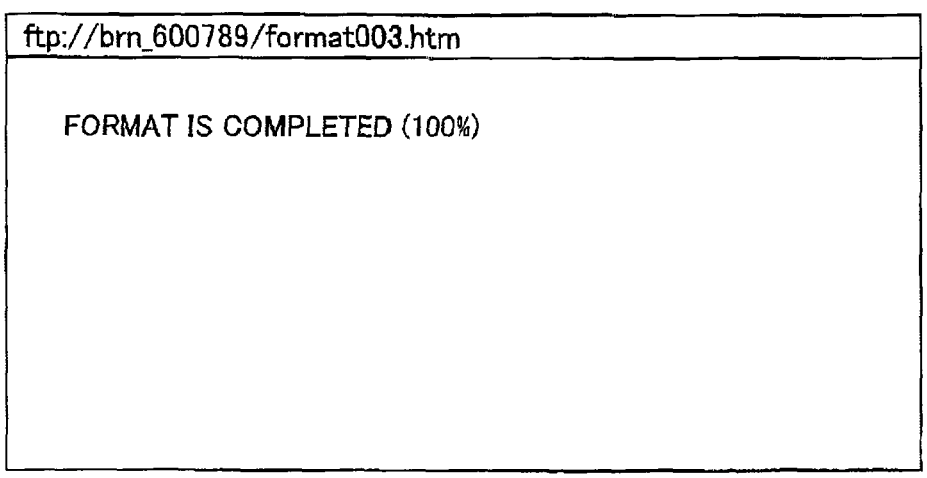

However, if formatting is not complete (S2610: NO), in S2640 the CPU 34 sets contents of FormatN.htm. Specifically, the CPU 34 sets the contents of FormatN.htm to include a message indicating the progress of formatting, a redirect command to redirect to FormatN+1.htm, and a cache deletion command to update FormatN+1.htm. In S2650 the CPU 34 creates the file FormatN.htm and, after incrementing the variable N by 1 in S2660, returns to S2610. The CPU 34 repeatedly loops back to S2610 until determining that the formatting operation is completed. The FormatN.htm file is created in S2650 of FIG. 39, is acquired in S2370 of FIG. 36, and is transferred to the client in S770 of FIG. 10. Since the FormatN.htm including the redirect command for transferring to FormatN+1.htm, another get process is started automatically and in S750 of FIG. 12 the memory card operating process is executed. FIGS. 40A-40C show sample displays for FormatN.htm. As can be seen in FIG. 40A-40C, the formatting progresses as the variable N increases. The timing for transferring the FormatN.htm file may be set as appropriate.

Figure 35B:
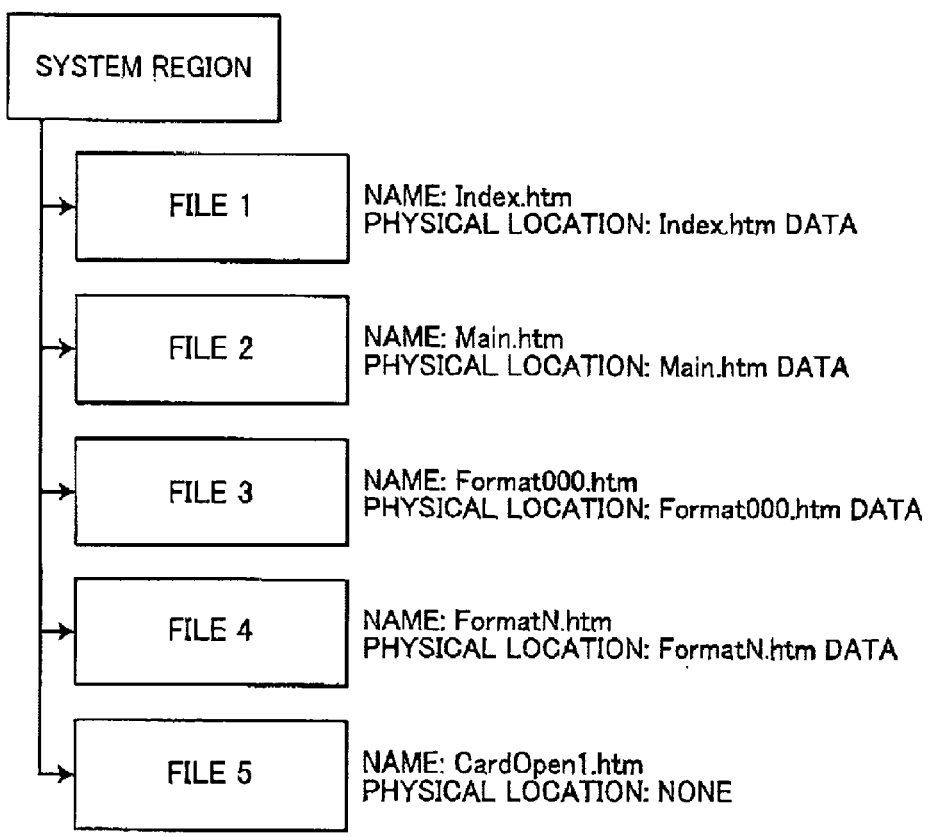

FIG. 35B conceptually illustrates the system region after executing the FTP process performed when Format000.htm through FormatN.htm is requested. In this example, the system region includes the files Format000.htm, FormatN.htm, and the like. While not indicated in the drawing, the files Format000.htm, Format001.htm, Format002.htm, Format003.htm, . . . are generated sequentially in the system region.

Figure 41:
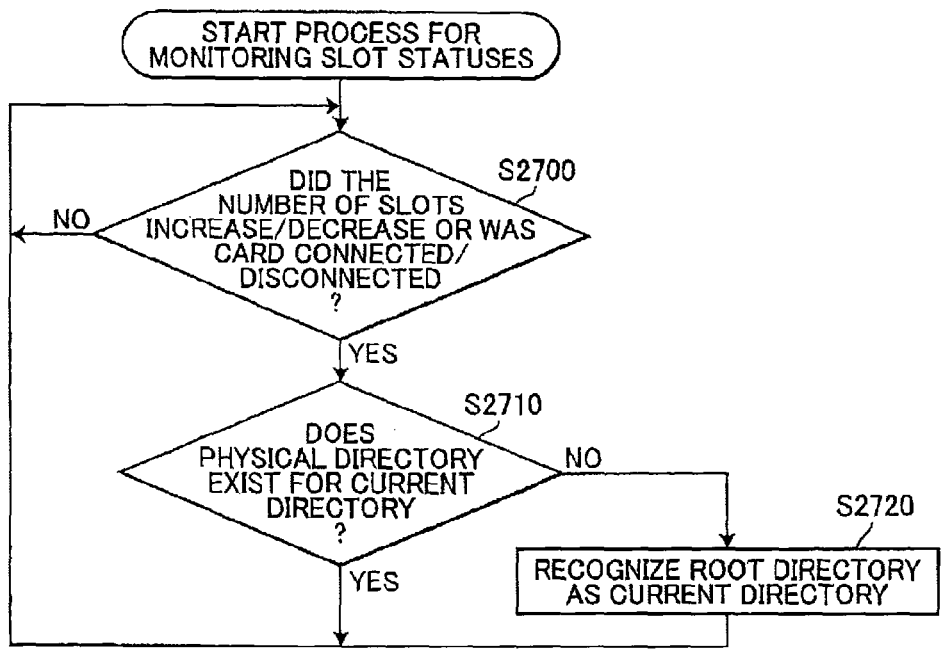
FIG. 41 is a flowchart illustrating steps in a process for monitoring memory card connectors in the printer according to the second embodiment.

FIG. 41 is a flowchart illustrating steps in a process for monitoring memory card connectors (slots). The process for monitoring slots is performed independently of the FTP server, but the slot status is continually conveyed to the FTP server.

In S2700 of the monitoring process, the CPU 34 determines whether the number of slots has increased or decreased or if a card has been connected or disconnected. If there is a change in the number of slots or in the connected status of cards (S2700: YES), in S2710 the CPU 34 determines whether a physical directory exists for the current directory. However, if the CPU 34 detects no change in the connected status of the cards (S2700: NO), the CPU 34 continually loops back to S2700 to keep monitoring the slots and card status.

If a physical directory exists for the current directory (S2710: YES), the CPU 34 returns to S2700.

However, if a physical directory does not exist for the current directory (S2710: NO), then in S2720 the CPU 34 recognizes the root directory as the current directory and returns to S2700.

Figure 42:
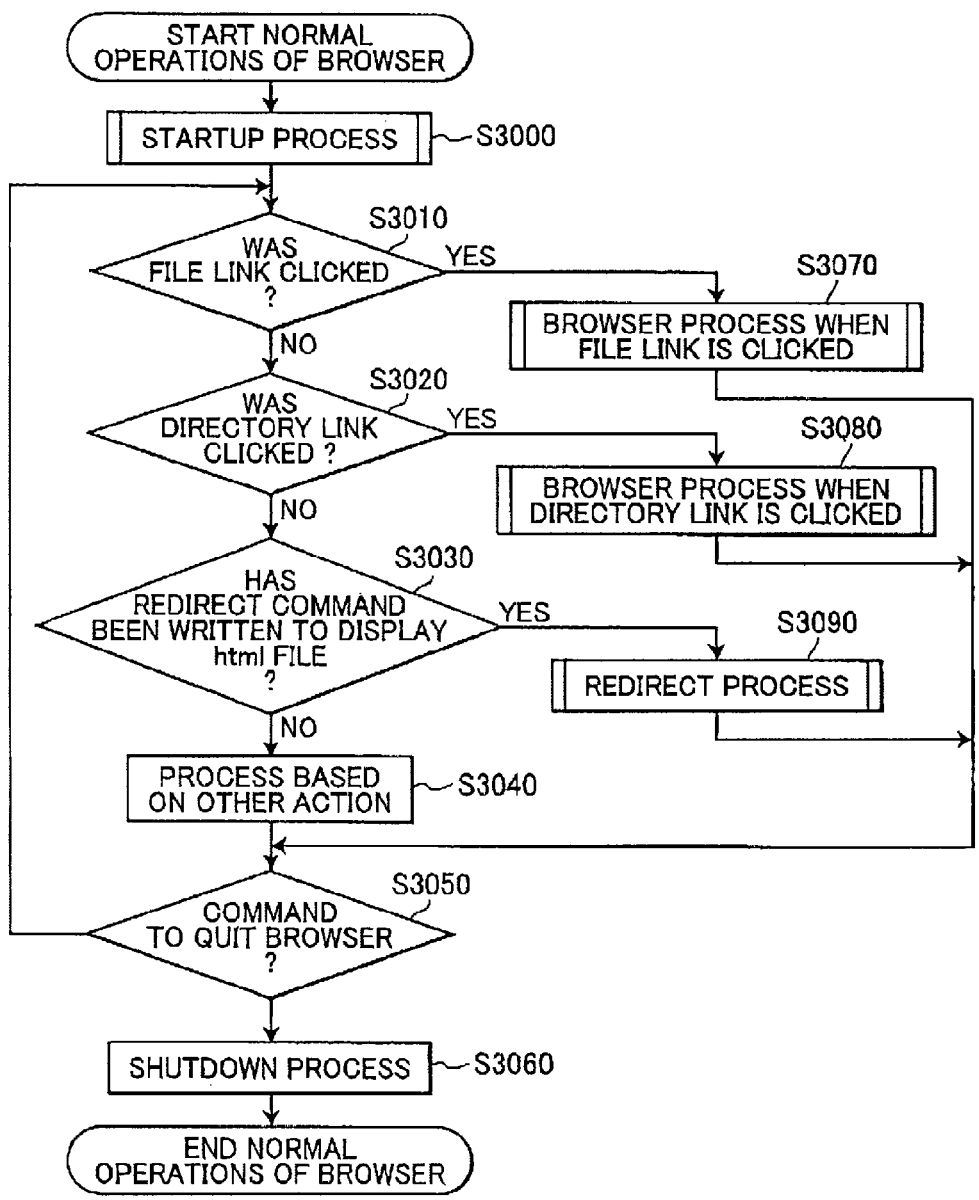
FIG. 42 is a flowchart illustrating steps in a normal operating process of a browser on the PC according to the second embodiment.

FIG. 42 is a flowchart illustrating steps in a normal operating process for a browser performed on the PC 3. In S3000 of this process, the PC 3 starts up the browser.

In S3010 the PC 3 confirms whether a link to a file in the browser has been clicked. If a link has been clicked (S3010: YES), in S3070 the browser executes a process performed when a file link has been clicked. In S3050 the PC 3 determines whether a command to end the browser has been issued.

If a command to quit the browser has been issued (S3050: YES), then in S3060 the PC 3 executes a process to close the browser and ends the normal browser operation.

However, if a file link has not been clicked in S3010 (S3010: NO), then in S3020 the browser confirms whether a directory link has been clicked. If a directory link has been clicked (S3020: YES), then in S3080 the browser executes a process performed when a directory link has been clicked, and the PC 3 subsequently advances to S3050.

However, if a directory link has not been clicked (S3020: NO), in S3030 the browser determines whether a redirect command has been written to the displayed HTML file. If a redirect command has been written (S3030: YES); then in S3090 the browser executes a redirect process and advances to S3050. However, if a redirect command has not been written (S3030: NO), in S3040 the PC 3 executes a process based on other action and advances to S3050.

Figure 43:
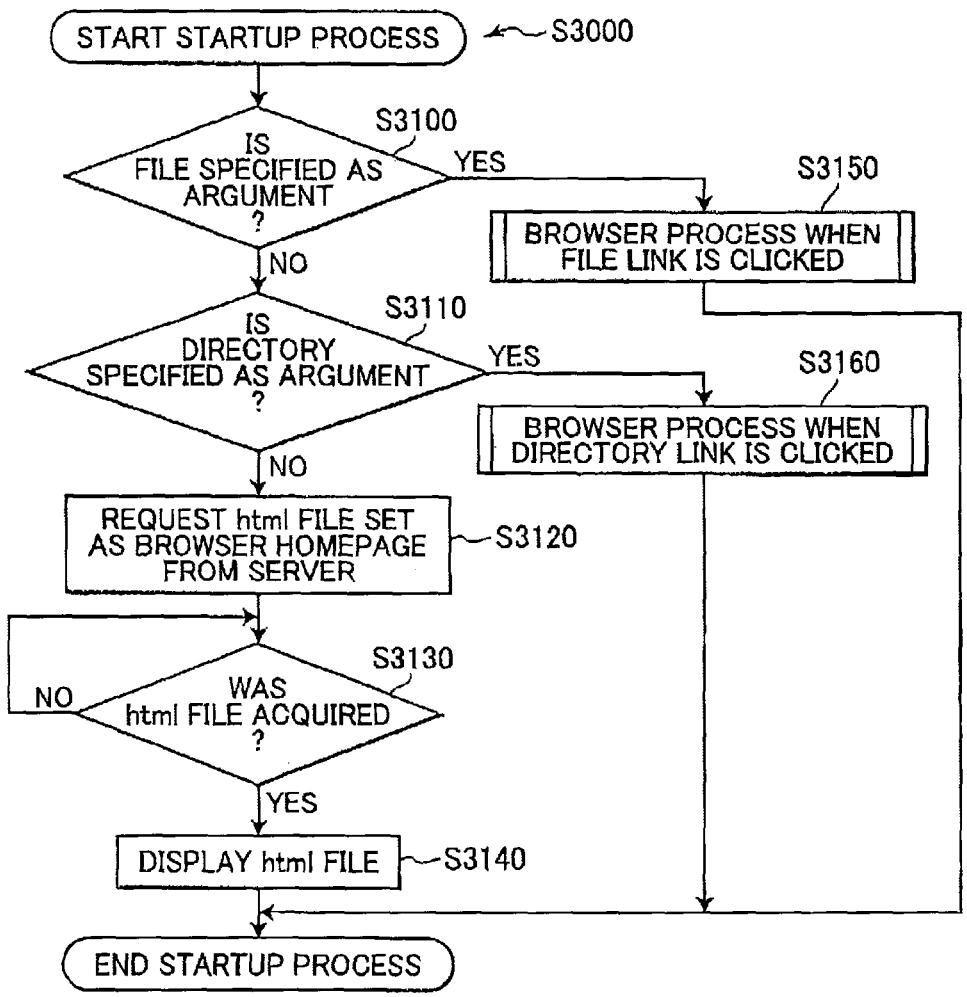
FIG. 43 is a flowchart illustrating steps in a process for starting up the browser on the PC.

FIG. 43 is a flowchart illustrating steps in the process of S3000 in FIG. 42 for starting the browser. In S3100 of this process, the browser determines whether a file has been specified as an argument. If a file has been specified as an argument (S3100: YES), then in S3150 the browser executes a process performed when a file link has been clicked, and subsequently ends the startup process.

However, if a file has not been specified as an argument (S3100: NO), in S3110 the browser determines whether a directory has been specified as an argument. If a directory has been specified as an argument (S3110: YES), then in S2160 the browser executes a process performed when a directory link has been clicked, and subsequently ends the startup process.

However, if a directory has not been specified as an argument (S3110: NO), in S3120 the browser requests the HTML file specified as the browser's homepage from the server.

In S3130 the browser determines whether the HTML file specified as the homepage was acquired. If the HTML file was acquired (S3130: YES), in S3140 the browser displays the acquired HTML file and subsequently ends the startup process.

However, if the HTML file specified as the homepage was not acquired (S3130: NO), then the browser waits until the HTML file can be acquired.

Figure 44:
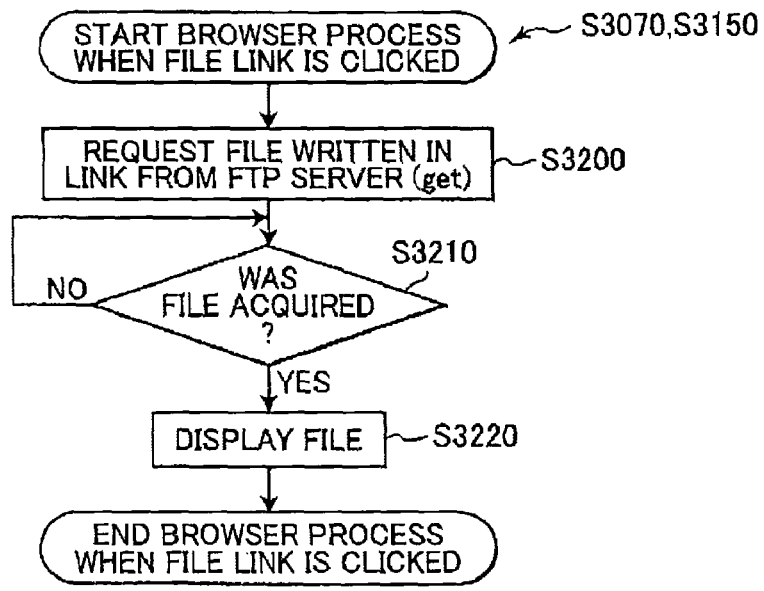
FIG. 44 is a flowchart illustrating steps in the browser process performed when a file link has been clicked on the PC.

FIG. 44 is a flowchart illustrating steps in the browser processes of S3070 in FIG. 42 and S3150 in FIG. 43 performed when a file link has been clicked. In S3200 of this process, the browser issues a request to the FTP server for the file written in the link. In S3210 the browser determines whether the file was acquired.

If the file was acquired (S3210: YES), then in S3220 the browser displays the acquired file and ends the browser process.

However, if the file was not acquired (S3210: NO), then the browser waits until the file can be acquired.

Figure 45:
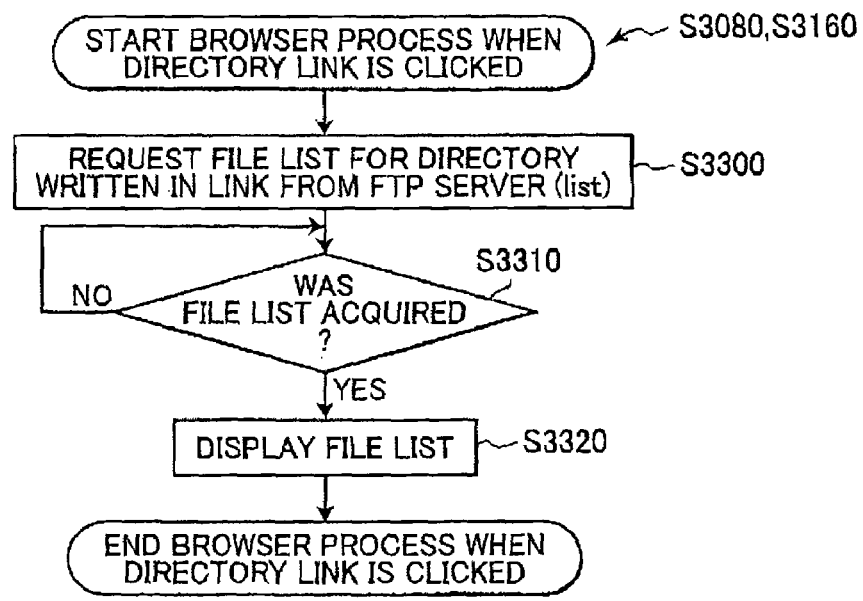
FIG. 45 is a flowchart illustrating steps in the browser process performed when a directory link has been clicked on the PC.

FIG. 45 is a flowchart illustrating steps in the browser processes of S3080 in FIG. 42 and S3160 in FIG. 43 performed when a directory link has been clicked. In S3300 at the beginning of this process, the browser issues a request to the FTP server for the file list in the directory written in the link.

In S3310 the browser determines whether the file list was acquired. If the file list was acquired (S3310; YES), then in S3320 the browser displays the acquired list and ends the browser process.

However, if the file list was not acquired (S3310: NO), then the browser waits until the file list can be acquired.

Figure 46:
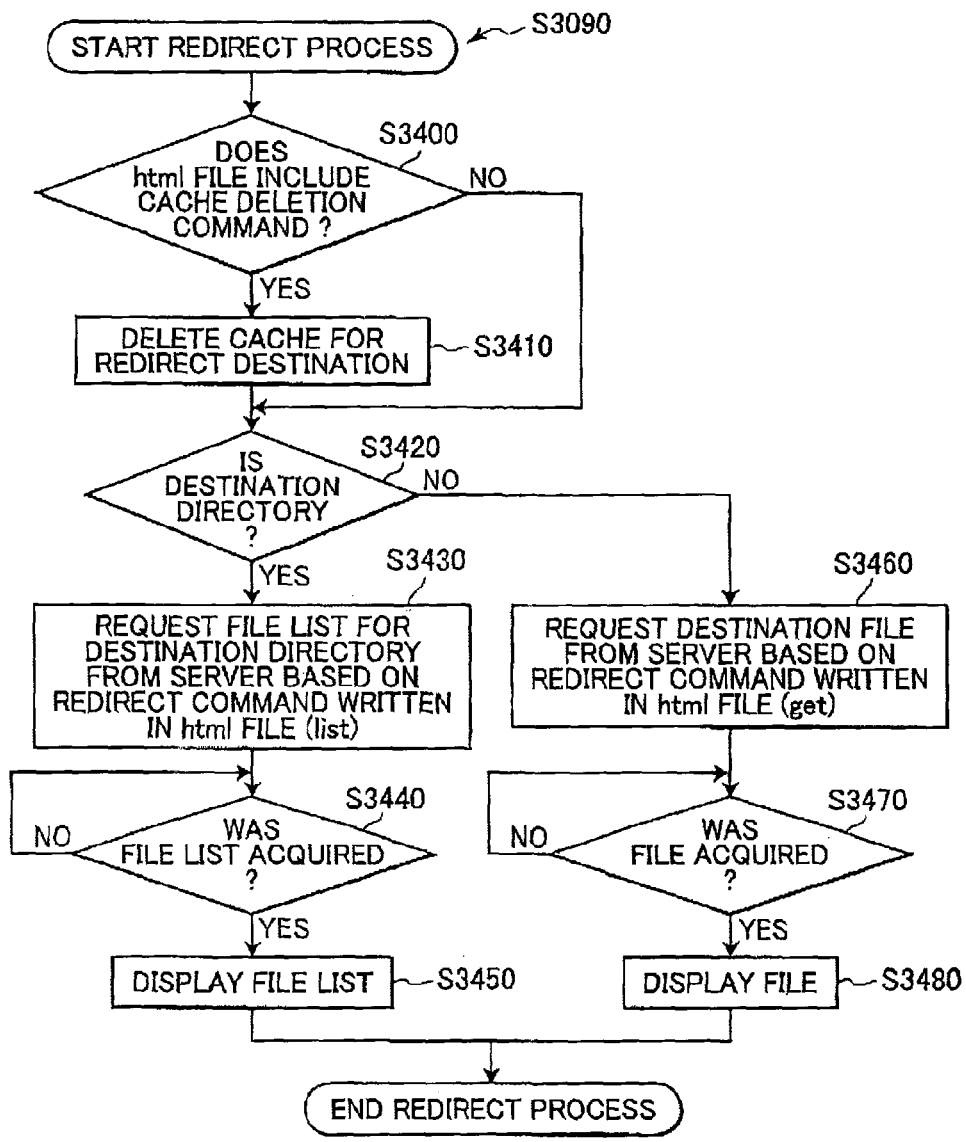
FIG. 46 is a flowchart illustrating steps in a redirect process performed with the browser on the PC.

FIG. 46 is a flowchart illustrating steps in the redirect process of S3090 in FIG. 42. In S3400 at the beginning of this process, the browser determines whether a cache deletion command is included in the displayed HTML file.

If the HTML file includes a cache deletion command (S3400: YES), then in S3410 the browser deletes the cache data for the redirect destination. However, if the HTML file does not include a cache deletion command (S3400: NO), then in S3420 the browser determines whether the redirect destination is a directory.

If the destination is a directory (S3420: YES), then in S3430 the browser issues a request to the server for a file list of the directory at the redirect destination (list command) based on the redirect command written in the HTML file.

In S3440 the browser determines whether the file list was acquired. If the file list was acquired (S3440: YES), then in S3450 the browser displays the acquired file list and ends the redirect process. However, if the file list was not acquired (S3440: NO), then the browser waits until the file list can be acquired.

However, if the redirect destination is not a directory (S3420: NO), then in S3460 the browser issues a request to the server for a file at the redirect destination (get command) based on the redirect command written in the HTML file.

In S3470 the browser determines whether the file was acquired. If the file was acquired (S3470: YES), then in S3480 the browser displays the acquired file and ends the redirect process. However, if the file was not acquired (S3470; NO), then the browser waits until the file can be acquired.

According to the second embodiment, the user of an FTP client can confirm the states of storage media by opening data received from the FTP server in a browser and can directly access the storage media or perform media-based operations by selecting operation-related links included in the file. Hence, an FTP client can be used to access storage media directly on the FTP server and to perform media-based operations, without expanding or modifying the FTP protocol.

The user can directly access storage media on an FTP server or perform media-based operations from an FTP client. Using hypertext data, the client can present storage media data and operating procedures to the user in an easy-to-understand format, using colors and the like. The user can discern which operations are possible at the point that the FTP processor receives an access request, thereby avoiding the inconvenience of the user specifying an operation that cannot be performed. The user can also obtain the physical file detailing the status of operations to learn the status of operations being executed by the FTP processor.

Since the user is notified of links for acquiring the physical file detailing the status of operations, the user can learn the status of operations being executed by the FTP processor. Since data is transmitted with a command for deleting cache data, the user can update files and open files in their most recent state when accessing the FTP processor with a browser that saves cache data. Further, the FTP client automatically issues requests for the next physical data reflecting the status of operations at the next stage, enabling the user to learn the status of operations without having to select a link manually.

The user can always receive notifications of the operation status even when a cache function is enabled on the FTP client, since the host always redirects to acquire the latest physical data. The user can easily perform operations on storage media connected to the desired connector. The user can even perform operations on the desired type of storage media.

Further, the user can easily view/acquire the structure of directories and files on storage media connected to the FTP processor through operation-related links. The user can also obtain physical data from storage media through the operation-related links. The user can format storage media connected to the FTP processor. The user can delete files from storage media connected to the FTP processor. The user can copy files between storage media connected to the FTP processor. Since there is no need to input an address into the browser, the user can easily confirm the status of or perform operations on storage media connected to the FTP processor from a host device.

While the printer 80 (and 180) is specified as an example of the FTP processor, it should be apparent that the present invention may be applied to any device configured of having media connectors and having an FTP server function, such as a scanning device, a display device, an audio device, a karaoke device, a digital camera, a projector, a disc drive, a sewing machine, a telephone, a mobile device, a machine tool, or a robot.

Still further, while the printer 80 is specified as an example of the FTP processing device, it should be apparent that the present invention may be applied to any other communication protocol which is configured to transfer filenames. Further, in the second embodiment, a link is used for transmitting the filename, the directory name, or the physical file. However, a link is used for copying and deleting a file in the storage media.

What is claimed is:

1. A non-transitory data processor communicable with a host device via a network, the data processor comprising:
    a media connecting unit that is capable of connecting a storage medium, wherein the media connecting unit executes a command to access a directory of the storage medium, and returns a code indicating that the directory of the storage medium was successfully accessed both when the directory of the storage medium is successfully accessed and when the directory of the storage medium is not successfully accessed;
    a file creating unit that creates a controlling file for controlling an operation for the storage medium;
    a data transmitting unit, wherein an FTP is used for communication between the data processor and the host device, that transmits data identifying the controlling file to the host device; and
    an operation executing unit that, in response to receiving a transmission request of the created controlling file, executes the operation for which the requested controlling file has been created by the file creating unit, the operation to be executed for the storage medium being different from a transmission operation for the controlling file.

2. The data processor according to claim 1, wherein the file creating unit sets an operation-related filename to the controlling file, the operation-related filename indicating the operation for the storage medium.

3. The data processor according to claim 2, wherein the file creating unit creates a result file having a result-reflecting filename indicating a result of the operation executed by the operation executing unit, and
    wherein the data transmitting unit transmits the result-reflecting filename to the host device.

4. The data processor according to claim 3, wherein the data transmitting unit transmits the result file to the host device in response to a request received from the host device requesting to transmit the result file.

5. The data processor according to claim 3, further comprising a storing portion which stores directory data indicating a prescribed directory, the prescribed directory including the controlling file having the operation-related filename, and
  wherein the data transmitting unit transmits data indicating that the prescribed directory is different from a physical directory of the storage medium.

6. The data processor according to claim 2, wherein the media connecting unit comprises a plurality of medium connecting portions, each of the plurality of medium connecting portions being capable of connecting the storage medium, and
  wherein the file creating unit sets the operation-related filename indicating the operation of a prescribed storage medium connected to one of the plurality of medium connecting portions.

7. The data processor according to claim 2, wherein the media connecting unit is capable of connecting a plurality of types of storage medium, and
  wherein the file creating unit sets the operation-related filename indicating the operation of one type of the plurality of types of storage medium.

8. The data processor according to claim 2, wherein the operation-related filename indicates a formatting operation of the storage medium connected to the media connecting unit.

9. The data processor according to claim 2, wherein the operation-related filename indicates a file deleting operation of the storage medium connected to the media connecting unit.

10. The data processor according to claim 2, wherein the operation-related filename indicates a file copying operation of the storage medium connected to the media connecting unit.

11. The data processor according to claim 2, further comprising a receiving unit that receives print data transmitted via the network; and
  a printing unit that prints the print data.

12. The data processor according to claim 1, wherein the data transmitted by the data transmitting unit includes an operation-related link corresponding to the operation for controlling the storage medium, and
  wherein the operation executing unit executes the operation based on the operation-related link in response to the transmission request received from the host device.

13. The data processor according to claim 12, wherein the operation-related link includes hypertext data having a URL, and
  wherein the operation executing unit executes the operation based on the URL in response to the transmission request received from the host device.

14. The data processor according to claim 12, wherein the operation-related link is set based on a status of the storage medium.

15. The data processor according to claim 12, further comprising a physical file data setting unit that sets physical file data representing an executing status of the operation executed by the operation executing unit,
  wherein the data transmitting unit transmits the physical file data to the host device.

16. The data processor according to claim 15, wherein the physical file data includes a link to a location of the physical file data.

17. The data processor according to claim 16, wherein the physical file data further includes a command for deleting cache data representing the link to the location of the physical file data.

18. The data processor according to claim 16, wherein the physical file data further includes a command for redirecting to the link to the location of the physical file data.

19. The data processor according to claim 16, wherein the physical file data setting unit that sets a first part of the physical file data representing an executing status of a first part of the operation executed by the operation executing unit, and a second part of the physical file data representing another executing status of a second part of the operation, and
  wherein the physical file data includes another link to a location of the second part of the physical file data.

20. The data processor according to claim 12, wherein the media connecting unit comprises a plurality of medium connecting portions, and
  wherein the operation-related link corresponds to the operation for controlling the storage medium connected to one of the plurality of medium connecting portions.

21. The data processor according to claim 12, wherein the media connecting unit is capable of connecting a plurality of types of storage medium, and
  wherein the operation-related link corresponds to the operation for controlling one type of the plurality of types of storage medium.

22. The data processor according to claim 12, wherein the operation-related link corresponds to the operation for transmitting a filename or a directory name in the storage medium connected to the media connecting unit to the host device.

23. The data processor according to claim 12, wherein the operation-related link corresponds to the operation for transmitting physical file data of a stored file in the storage medium connected to the media connecting unit to the host device.

24. The data processor according to claim 12, wherein the operation-related link corresponds to the operation for formatting the storage medium connected to the media connecting unit.

25. The data processor according to claim 12, further comprising a receiving unit that receives print data transmitted via the network; and
  a printing unit that prints the print data.

26. A data processing system comprising:
  a host device that includes a display unit; and
  a data processor that is communicable with the host device via a network, wherein an FTP is used for communication between the data processor and the host device, the processor comprising:
    a media connecting unit that is capable of connecting a storage medium, wherein the media connecting unit executes a command to access a directory of the storage medium, and returns a code indicating that the directory of the storage medium was successfully accessed both when the directory of the storage medium is successfully accessed and when the directory of the storage medium is not successfully accessed;
    a file creating unit that creates a controlling file for controlling an operation for the storage medium;
    a data transmitting unit that transmits data identifying the controlling file to the host device; and
    an operation executing unit that, in response to receiving a transmission request of the created controlling file, executes the operation for which the requested controlling file has been created by the file creating unit, the operation to be executed for the storage medium being different from a transmission operation for the controlling file,
  wherein the display unit displays the data, if the host device receives the controlling file.

27. The data processing system according to claim 26, wherein the file creating unit sets an operation-related filename to the controlling file, the operation-related filename indicating the operation for the storage medium,
    wherein the operation executing unit executes the operation when the operation-related filename of the controlling file is designated, and
    wherein the display unit displays the operation-related filename of the controlling file, if the host device receives the operation-related filename.

28. The data processing system according to claim 26, wherein the data transmitted by the data transmitting unit includes an operation-related link corresponding to the operation for controlling the storage medium,
    wherein the operation executing unit executes the operation based on the operation-related link in response to the transmission request received from the host device, and
    wherein the display unit displays the data including the operation-related link, if the host device access to the operation-related link.

29. The data processing system according to claim 28, wherein the host device stores a shortcut file to the controlling file.

30. A method of operating a data processing system, the data processing system comprising a host device and a processor communicable with the host device via a network, the processor comprising a media connecting unit that is capable of connecting a storage medium, the method comprising:
    executing a command to access a directory of the storage medium, and returns a code indicating that the directory of the storage medium was successfully accessed both when the directory of the storage medium is successfully accessed and when the directory of the storage medium is not successfully accessed;
    creating a controlling file for controlling an operation for the storage medium;
    transmitting data, wherein an FTP is used for communication between the data processor and the host device, identifying the controlling file to the host device; and
    executing, in response to receiving a transmission request of the created controlling file, the operation for which the requested controlling file has been created by the file creating unit, the operation to be executed for the storage medium being different from a transmission operation for the controlling file.

31. The method according to claim 30, further comprising setting an operation-related filename to the file, the operation-related filename indicating the operation for the storage medium.

32. The method according to claim 30, wherein the data includes an operation-related link corresponding to the operation for controlling the storage medium, and
    wherein, in the executing process, the operation executes based on the operation-related link in response to the transmission request received from the host device.

* * * * *